United States Patent
Rizk et al.

(10) Patent No.: US 10,114,821 B2
(45) Date of Patent: *Oct. 30, 2018

(54) METHOD AND SYSTEM TO ACCESS TO ELECTRONIC BUSINESS DOCUMENTS

(75) Inventors: Thomas A. Rizk, Franklin Lakes, NJ (US); Scott R. Jeffery, Westfield, NJ (US)

(73) Assignee: TractManager, Inc., Chattanooga, TN (US)

( * ) Notice: Subject to any disclaimer, the term of this patent is extended or adjusted under 35 U.S.C. 154(b) by 1573 days.

This patent is subject to a terminal disclaimer.

(21) Appl. No.: 11/201,178

(22) Filed: Aug. 11, 2005

(65) Prior Publication Data
US 2006/0059162 A1    Mar. 16, 2006

Related U.S. Application Data

(63) Continuation-in-part of application No. 11/142,257, filed on Jun. 2, 2005, now Pat. No. 7,194,677, which is a continuation of application No. 09/748,105, filed on Dec. 27, 2000, now Pat. No. 6,957,384.

(51) Int. Cl.
| | | |
|---|---|---|
| *G06F 17/30* | (2006.01) | |
| *G06F 17/21* | (2006.01) | |
| *H04N 1/00* | (2006.01) | |

(52) U.S. Cl.
CPC ........ *G06F 17/30011* (2013.01); *G06F 17/21* (2013.01); *G06F 17/211* (2013.01); *H04N 1/00* (2013.01)

(58) Field of Classification Search
CPC ........... G06F 17/2205; G06F 17/30011; G06F 17/211; G06F 17/21; G06F 17/22; H04N 1/005

USPC ............ 715/200, 255, 229; 1/200, 255, 229
See application file for complete search history.

(56) References Cited

U.S. PATENT DOCUMENTS

| | | | |
|---|---|---|---|
| 4,977,906 | A | 12/1990 | Di Scipio |
| 5,159,667 | A | 10/1992 | Borrey et al. |
| 5,161,214 | A | 11/1992 | Addink et al. |
| 5,479,600 | A | 12/1995 | Wroblewski et al. |

(Continued)

OTHER PUBLICATIONS

Website http://www.mycontacts.com/; Contract Management and Business Expense Software, p. 1 of 1, Apr. 5, 2001.

(Continued)

*Primary Examiner* — Thu Huynh
(74) *Attorney, Agent, or Firm* — Perkins Coie LLP

(57) ABSTRACT

A method for storing, organizing and providing remote electronic access to documents. A coversheet including a standard set of identification data characterizing each document is developed and stored. A digital version of each document is created and stored by scanning each contract. Each digital version includes a scanned image and a searchable text file, wherein the text is overlaid with the image. An index of bookmarks identifying sections of the digital version of each document is generated. Selected fields of information are captured from the digital version of the document. The documents are organized and cross-referenced in a database that includes the captured information and additional information related to each document. Designated parties are alerted of critical dates associated with each document. Remote electronic access to the documents is provided over the internet.

39 Claims, 46 Drawing Sheets

(56) References Cited

U.S. PATENT DOCUMENTS

| | | | |
|---|---|---|---|
| 5,528,742 A | 6/1996 | Moore et al. | |
| 5,581,682 A | 12/1996 | Anderson et al. | 715/530 |
| 5,598,557 A | 1/1997 | Doner et al. | |
| 5,623,679 A | 4/1997 | Rivette et al. | |
| 5,623,681 A | 4/1997 | Rivette et al. | |
| 5,627,661 A | 5/1997 | Negishi et al. | |
| 5,666,490 A | 9/1997 | Gillings et al. | 709/238 |
| 5,669,007 A | 9/1997 | Tateishi | |
| 5,671,067 A | 9/1997 | Negishi et al. | |
| 5,726,884 A | 3/1998 | Sturgeon et al. | |
| 5,729,741 A | 3/1998 | Liaguno et al. | |
| 5,748,805 A | 5/1998 | Withgott et al. | |
| 5,774,357 A | 6/1998 | Hoffberg et al. | |
| 5,850,490 A * | 12/1998 | Johnson | 382/306 |
| 5,860,073 A | 1/1999 | Ferrel et al. | |
| 5,870,770 A | 2/1999 | Wolfe | |
| 5,874,717 A * | 2/1999 | Kern et al. | 235/379 |
| 5,875,108 A | 2/1999 | Hoffberg et al. | |
| 5,892,845 A | 4/1999 | Yamanaka et al. | |
| 5,893,908 A | 4/1999 | Cullen et al. | |
| 5,940,800 A | 8/1999 | Bennett et al. | |
| 5,940,843 A * | 8/1999 | Zucknovich et al. | 715/210 |
| 5,960,448 A * | 9/1999 | Reichek et al. | 715/236 |
| 5,995,959 A | 11/1999 | Friedman et al. | 707/3 |
| 5,999,664 A | 12/1999 | Mahoney et al. | |
| 6,009,442 A | 12/1999 | Chen et al. | |
| 6,026,388 A * | 2/2000 | Liddy et al. | |
| 6,100,890 A | 8/2000 | Bates et al. | |
| 6,144,975 A | 11/2000 | Harris, Jr. et al. | 707/901 |
| 6,209,004 B1 * | 3/2001 | Taylor | 715/236 |
| 6,253,323 B1 * | 6/2001 | Cox et al. | 713/176 |
| 6,272,484 B1 | 8/2001 | Martin et al. | |
| 6,295,542 B1 | 9/2001 | Corbin | |
| 6,377,704 B1 | 4/2002 | Cooperman | |
| 6,519,763 B1 | 2/2003 | Kaufer et al. | |
| 6,523,038 B1 | 2/2003 | Iida et al. | |
| 6,533,822 B2 * | 3/2003 | Kupiec | 715/253 |
| 6,552,728 B1 | 4/2003 | Moore et al. | |
| 6,665,836 B1 * | 12/2003 | Wynblatt et al. | 715/205 |
| 6,694,053 B1 | 2/2004 | Burns et al. | |
| 6,718,340 B1 * | 4/2004 | Hartman et al. | |
| 6,725,227 B1 | 4/2004 | Li | |
| 6,810,404 B1 * | 10/2004 | Ferguson et al. | 707/200 |
| 6,832,350 B1 | 12/2004 | Bates et al. | |
| 6,850,900 B1 * | 2/2005 | Hare et al. | 705/80 |
| 6,865,713 B1 | 3/2005 | Bates et al. | |
| 6,892,348 B1 | 5/2005 | Truelove et al. | |
| 6,957,384 B2 * | 10/2005 | Jeffery et al. | 715/202 |
| 6,992,687 B1 | 1/2006 | Baird et al. | |
| 7,031,960 B1 * | 4/2006 | Costin et al. | 715/843 |
| 7,047,491 B2 * | 5/2006 | Schubert et al. | 715/256 |
| 7,165,220 B1 | 1/2007 | Bates et al. | |
| 7,194,677 B2 * | 3/2007 | Rizk et al. | 715/205 |
| 7,216,233 B1 | 5/2007 | Krueger | 713/176 |
| 7,401,125 B1 * | 7/2008 | Uchida et al. | 709/217 |
| 2001/0003819 A1 | 6/2001 | Matsumoto | |
| 2001/0025309 A1 | 9/2001 | MacLeod Beck et al. | |
| 2001/0054049 A1 | 12/2001 | Maeda et al. | |
| 2001/0054106 A1 * | 12/2001 | Anderson et al. | 709/227 |
| 2002/0029232 A1 | 3/2002 | Bobrow et al. | |
| 2002/0095432 A1 * | 7/2002 | Shimomura et al. | 707/200 |
| 2002/0138582 A1 | 9/2002 | Chandra et al. | 709/206 |
| 2002/0174050 A1 * | 11/2002 | Eynard et al. | 705/37 |
| 2003/0033319 A1 * | 2/2003 | Van Der et al. | 707/102 |
| 2004/0034835 A1 * | 2/2004 | Kuruoglu et al. | 715/530 |
| 2005/0024679 A1 * | 2/2005 | Yoda et al. | 358/1.15 |
| 2006/0059162 A1 | 3/2006 | Rizk et al. | |
| 2007/0283267 A1 | 12/2007 | Jeffery et al. | |
| 2007/0283288 A1 | 12/2007 | Jeffery et al. | |
| 2008/0046417 A1 | 2/2008 | Jeffery et al. | |

OTHER PUBLICATIONS

Website http://www.contractmanager.net, Contract Management Solutions, Copyright 2001, Contract Management Solutions, Inc., pp. 1 and 2, Apr. 23, 2001.

Website http://tractmanager.com/, TractManager: Technology-Based Contract Management, Copyright 2000, TractManager LLC, p. 1 of 1, Apr. 5, 2001.

* cited by examiner

ORGANIZATION NAME: _____  TODAY'S DATE: _____

CONTRACT COVER PAGE

PLEASE CIRCLE THE NUMBER THAT CORRESPONDS WITH THE APPROPRIATE SELECTION OF CONTRACTING ENTITY; DEPARTMENT; CONTRACT TYPE; AND SITE AND ATTACH THIS COVER PAGE TO THE DOCUMENT THAT WILL BE SCANNED. IN THE CASE OF USER-RESPONSIBLE PARTIES, PLEASE SELECT FROM YOUR USER LIST THE TWO INDIVIDUALS RESPONSIBLE FOR MANAGING THIS AGREEMENT, WHICH ARE ALSO THE TWO PEOPLE THAT WILL RECEIVE E-MAIL NOTIFICATIONS WHEN THIS AGREEMENT IS NEARING EXPIRATION.

112A CONTRACTING ENTITY: (PLEASE SELECT ONE FROM YOUR CONTRACTING ENTITY SETUP FORM)

| 1 | 2 | 3 | 4 | 5 | 6 | 7 | 8 | 9 | 10 | 11 | 12 | 13 | 14 | 15 |
|---|---|---|---|---|---|---|---|---|----|----|----|----|----|----|

102A

114A DEPARTMENT: (PLEASE SELECT ONE FROM YOUR LIST OF DEPARTMENTS)

| 1 | 2 | 3 | 4 | 5 | 6 | 7 | 8 | 9 | 10 | 11 | 12 |
|---|---|---|---|---|---|---|---|---|----|----|----|
| 13 | 14 | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 |
| 61 | 62 | 63 |    |    |    |    |    |    |    |    |    |

104A

116A DEPARTMENT: (PLEASE SELECT ONE FROM YOUR LIST OF DEPARTMENTS)

| 1 | 2 | 3 | 4 | 5 | 6 | 7 | 8 | 9 | 10 | 11 | 12 |
|---|---|---|---|---|---|---|---|---|----|----|----|
| 13 | 14 | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 |
| 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 |
| 85 | 86 | 87 | 88 | 89 | 90 | 91 | 92 | 93 | 94 | 95 | 96 |

106A

118A SITE: (PLEASE SELECT ONE FROM YOUR SITE SETUP FORM)

| 1 | 2 | 3 | 4 | 5 | 6 | 7 | 8 | 9 | 10 | 11 | 12 | 13 | 14 | 15 |
|---|---|---|---|---|---|---|---|---|----|----|----|----|----|----|

108A

120A USER – RESPONSIBLE PARTIES: (PLEASE SELECT TWO FROM YOUR USER LIST)

| 1 | 2 | 3 | 4 | 5 | 6 | 7 | 8 | 9 | 10 | 11 | 12 | 13 | 14 | 15 |
|---|---|---|---|---|---|---|---|---|----|----|----|----|----|----|
| 16 | 17 | 18 | 19 | 20 | 21 | 22 | 23 | 24 | 25 | 26 | 27 | 28 | 29 | 30 |

| Contract Library |
|---|
| USAHCS HOME CARE – MT SYSTEM ADMINISTRATOR |
| Report Writer |
| Directory |
| Add Documents |
| Administration |
| User Manual |
| DDP |
| Contracting Entity |
| Department |
| Contract Type |
| Workflow Manager |

Organization: USAHCS Home Care - MT     Today's Date: JUN 21, 2005    $102B_1$

CONTRACTING ENTITY LIST

[PRINT] [ADD] [DELETE]

| NAME | DOP NO. |
|---|---|
| Health Hospice | 7 |
| Home Care   $104B_1$ | 40 |
| No. of Contracting Entities: | 2 |

$106B_1$

Organization: USAHCS Home Care - MT     Today's Date: JUN 21, 2005    $102B_2$

SITE LIST

[PRINT] [ADD] [DELETE]

| NAME | DOP NO. |
|---|---|
| Home Care and Health Hospice | 2 |
| test   $104B_2$ | 111 |
| Test Site | 112 |
| No. of Sites: | 3 |

$106B_2$

⋮

$103B_N$

Organization: USAHCS Home Care - MT     Today's Date: JUN 21, 2005

USER LIST

[PRINT] [ADD] [DELETE]

| NAME | EMAIL | DOP NO. |
|---|---|---|
| Abner, Kristin | kabner@usahcs.org | 273 |
| Adams, Ansil | cbundy.10@yahoo.com | 73 |
| Administrator, John | postmaster@tractmanager.com | 353 |
| Administrator, System | test@tractmanager.com | 346 |
| Administrator, USAHC | helpdesk@tractmanager.com | 14 |
| Alexis, Daniel | cbundy@tractmanager.com | 1 |
| asp, test | @ | 1001 |
| Becker, Gordon   $104B_N$ | obecker@usahcs.org | 93 |
| Editor, John | postmaster@tractmanager.com | 352 |
| Kicker, Christopher | ckicker@usahcs.org | 31 |
| Oak, Arturo | aoak@usahcs.org | 318 |
| Shepherd, Tom | tshepherd@usahcs.org | 44 |
| test, 2 | cbundy.18@yahoo.com | 355 |
| test, user2 | @ | 356 |
| user1, test | email@test | 1000 |
| No. of Users: | | 15 |

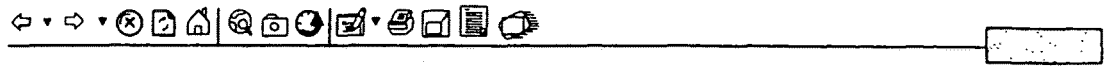
  
CONTRACT　　EXECUTIVE　　　　WORKFLOW
LIBRARY　　　COMMUNICATION　MANAGER
*FIG. 2*

FIG. 3

CONTRACT SUMMARY - CONTRACT NUMBER

| CONTRACT NUMBER | CONTRACTING ENTITY/VENDOR (OTHER PARTY) | DESCRIPTION/DEPARTMENT | ORIGINAL DATE/ EXPIRATION DATE |
|---|---|---|---|
| 5896.1C | TRACT MANAGER LLC, NOTABLE SOLUTIONS, INC. | SOFTWARE LICENSE & SERVICE AGREEMENT INFORMATION TECHNOLOGY | NOVEMBER 6, 2000/ NOVEMBER 6, 2001 |
| 9501.4C | MEDITRACT LLC, UAB HEALTH SYSTEM | SOFTWARE LICENSE & SERVICE AGREEMENT OPERATIONS | JULY 18, 2000/ JULY 17, 2001 |
| 9501.7C | MEDITRACT LLC, ADVENTIST HEALTH SYSTEM | SOFTWARE LICENSE & SERVICE AGREEMENT OPERATIONS | AUGUST 3, 2000/ AUGUST 2, 2003 |
| 9501.10C | MEDITRACT LLC, ERLANGER MEDICAL CENTER | SOFTWARE LICENSE & SERVICE AGREEMENT OPERATIONS | MAY 10, 1999/ MAY 9, 2001 |
| 9501.13C | MEDITRACT LLC, LIFE CARE MANAGEMENT SERVICES | SOFTWARE LICENSE & SERVICE AGREEMENT OPERATIONS | JULY 9, 1999/ JULY 8, 2001 |
| 9501.14C | MEDITRACT LLC, UCSF STANFORD HEALTH CARE | SOFTWARE LICENSE & SERVICE AGREEMENT OPERATIONS | AUGUST 12, 1999/ AUGUST 11, 2001 |
| 9501.16C | MEDITRACT LLC, BAPTIST HOSPITAL, INC. | SOFTWARE LICENSE & SERVICE AGREEMENT OPERATIONS | MAY 24, 1999/ MAY 23, 2001 |

*FIG. 4 (CONT)-1*

CONTRACT SUMMARY - CONTRACT NUMBER

| CONTRACT NUMBER | CONTRACTING ENTITY/VENDOR (OTHER PARTY) | DESCRIPTION/DEPARTMENT | ORIGINAL DATE/ EXPIRATION DATE |
|---|---|---|---|
| 9501.17C | MEDITRACT LLC, SHORE HEALTH SYSTEM, INC. | SOFTWARE LICENSE & SERVICE AGREEMENT OPERATIONS | JULY 25, 2000/ JULY 24, 2003 |
| 9501.18C | MEDITRACT LLC, RALEIGH GENERAL HOSPITAL | SOFTWARE LICENSE & SERVICE AGREEMENT OPERATIONS | AUGUST 9, 2000/ AUGUST 8, 2003 |
| 9501.19C | MEDITRACT LLC, VIRGINIA BLOOD SERVICES | SOFTWARE LICENSE & SERVICE AGREEMENT OPERATIONS | JUNE 16, 2000/ JUNE 15, 2003 |
| 9501.20C | MEDITRACT LLC, ST. MARY MEDICAL CENTER | SOFTWARE LICENSE & SERVICE AGREEMENT OPERATIONS | FEBRUARY 18, 2000/ FEBRUARY 17, 2003 |
| 9501.21C | MEDITRACT LLC, SOUTH CAROLINA HEALTHCARE RESOURCES, INC. | HOSPITAL ASSOCIATION AGREEMENT MARKETING & SALES | AUGUST 11, 2000/ AUGUST 10, 2002 |
| 9501.22C | MEDITRACT LLC, ALABAMA DIVERSIFIED HEALTH SERVICES | HOSPITAL ASSOCIATION AGREEMENT MARKETING & SALES | JUNE 6, 2000/ JUNE 5, 2002 |
| 9501.24C | MEDITRACT LLC, PERSHING YOAKLEY & ASSOC LLC | HOSPITAL ASSOCIATION AGREEMENT | JANUARY 20, 2000/ JANUARY 19, 2002 |

*FIG. 4 (CONT)-2*

⇐ PREVIOUS ⇨ NEXT ✥ EXPAND ▭ COLLAPSE ⌕ SEARCH

CONTRACT SUMMARY - TYPE

TYPE CONTRACTING ENTITY/VENDOR (OTHER PARTY) CONTRACT NUMBER DESCRIPTION/
DEPARTMENT ORIGINAL DATE/EXPIRATION DATE

▲ COMPUTER EQUIPMENT LEASE
▲ CONTRACT LABOR
▲ EQUIPMENT LEASE (OFFICE)
▲ FINANCING AGREEMENT
▲ GROUP INSURANCE POLICY
▲ HOSPITAL ASSOCIATION AGREEMENT
▲ HOSTING SERVICES AGREEMENT
▲ INFORMATION SERVICES AGREEMENT
▲ INSURANCE POLICY
▲ OPERATING AGREEMENT
▲ PAYROLL SERVICE AGREEMENT
▲ PERMITS AND LICENSES
▲ REAL ESTATE LEASE
▲ SALES REPRESENTATIVE AGREEMENT
▲ SOFTWARE LICENSE & SERVICE AGREEMENT

⇐ PREVIOUS ⇨ NEXT ✥ EXPAND ▭ COLLAPSE ⌕ SEARCH

TractManager
◆ CONTRACT DATABASE
Medical Demo
① CONTRACT FILTER
② CONTRACT NUMBER
③ TYPE
④ PARTY
⑤ LOCATION
⑥ DATES
⑦ CRITICAL ISSUES
⑧ CRITICAL LIST
⑨ STATUS
⑩ NEW CONTRACT
⑪ Vendor Directory
⑫ ADMIN
▸ WORK FLOW
HELP
Get Adobe Reader
Adobe

*FIG. 5*

⇦ PREVIOUS ⇨ NEXT ✚ EXPAND ⊟ COLLAPSE 🔍 SEARCH

| SIGNATORY | CONTRACTING ENTITY/VENDOR (OTHER PARTY) | SIGNATORY CONTRACT # | CONTRACT/DEPARTMENT | ORIGINAL DATE/ EXPIRATION DATE |
|---|---|---|---|---|
| BEN HERNSBY | MEDITRACT LLC, LIFE CARE MANAGEMENT SERVICES | 9501.13C | SOFTWARE LICENSE & SERVICE AGREEMENT OPERATIONS | JULY 9, 1999/ JULY 8, 2001 |
| BEN HERNSBY | MEDITRACT LLC, MHA DIVERSIFIED SERVICES, INC. MHA | 9501.63C | HOSPITAL ASSOCIATION AGREEMENT MARKETING & SALES | AUGUST 30, 1999/ AUGUST 29, 2001 |
| BEN HERNSBY | MEDITRACT LLC, PERSHING YOAKLEY & ASSOC LLC | 9501.24C | HOSPITAL ASSOCIATION AGREEMENT MARKETING & SALES | JANUARY 20, 2000/ JANUARY 19, 2002 |
| BEN HERNSBY | MEDITRACT LLC, SOUTH CAROLINA HEALTHCARE RESOURCES, INC. | 9501.21C | HOSPITAL ASSOCIATION AGREEMENT MARKETING & SALES | AUGUST 11, 2000/ AUGUST 10, 2002 |
| BEN HERNSBY | MEDITRACT LLC, ST. MARY MEDICAL CENTER | 9501.20C | SOFTWARE LICENSE & SERVICE AGREEMENT OPERATIONS | FEBRUARY 18, 2000/ FEBRUARY 17, 2003 |
| BEN HERNSBY | MEDITRACT LLC, SUNTRUST BANK, CHATTANOOGA | 9501.55C | FINANCING AGREEMENT FINANCE | MARCH 3, 1999/ MARCH 3, 2005 |
| BEN HERNSBY | MEDITRACT LLC, XTRA HELP PERSONNEL, INC. | 9501.72C | CONTRACT LABOR HUMAN RESOURCES | DECEMBER 6, 1999/ DECEMBER 6, 2000 |
| BROOKS AYERS | MEDITRACT LLC, NORTH MISSISSIPPI HEALTH SERVICES | 9501.58C | SOFTWARE LICENSE & SERVICE AGREEMENT OPERATIONS | JANUARY 13, 2000/ JANUARY 13, 2002 |

FIG. 6 (CONT)-1

| | | | | ⇦ PREVIOUS ⇨ NEXT | ✚ EXPAND ⊟ COLLAPSE 🔍 SEARCH | |
|---|---|---|---|---|---|---|

TractManager
◆ CONTRACT DATABASE
  Medical Demo
  ⊕ CONTRACT FILTER
  ⊕ CONTRACT
  ⊕ PARTY
    SIGNATORY
    OTHER SIGNATORY
    RESPONSIBLE
    VENDOR (OTHER PARTY)
  ⊕ LOCATION
  ⊕ DATES
  ⊕ CRITICAL ISSUES
  ⊕ CRITICAL LIST
  ⊕ STATUS
  ⊕ NEW CONTRACT
  ⊕ Vendor Directory
  ➤ WORK FLOW
  HELP  POLICY
  Get Adobe Reader

| SIGNATORY | CONTRACTING ENTITY/VENDOR (OTHER PARTY) | CONTRACT # | CONTRACT/DEPARTMENT | ORIGINAL DATE/ EXPIRATION DATE |
|---|---|---|---|---|
| COLE POWELL | MEDITRACT LLC, ADP | 9501.68C | PAYROLL SERVICE AGREEMENT HUMAN RESOURCES | MARCH 10, 2000/ MARCH 10, 2001 |
| COLE POWELL | MEDITRACT LLC, BAPTIST HOSPITAL, INC. | 9501.16C | SOFTWARE LICENSE & SERVICE AGREEMENT OPERATIONS | MAY 24, 1999/ MAY 23, 2001 |
| COLE POWELL | MEDITRACT LLC, ERLANGER MEDICAL CENTER | 9501.10C | SOFTWARE LICENSE & SERVICE AGREEMENT OPERATIONS | MAY 10, 1999/ MAY 9, 2001 |
| COLE POWELL | MEDITRACT LLC, UCSF STANFORD HEALTH CARE | 9501.14C | SOFTWARE LICENSE & SERVICE AGREEMENT OPERATIONS | AUGUST 12, 1999/ AUGUST 11, 2001 |
| GARY O'GWEN | MEDITRACT LLC, ALABAMA DIVERSIFIED HEALTH SERVICES | 9501.22C | HOSPITAL ASSOCIATION AGREEMENT MARKETING & SALES | JUNE 6, 2000/ JUNE 5, 2002 |
| GARY O'GWEN | MEDITRACT LLC, LEICHTMAN, ROBERT | 9501.25C | SALES REPRESENTATIVE AGREEMENT MARKETING & SALES | JUNE 10, 2000/ JUNE 9, 2001 |

*FIG. 6 (CONT)-2*

OTHER SIGNATORY

| OTHER SIGNATORY | CONTRACTING ENTITY/VENDOR (OTHER PARTY) | CONTRACT # | CONTRACT/DEPARTMENT | ORIGINAL DATE/ EXPIRATION DATE |
|---|---|---|---|---|
| JOHNNY ALVAREZ | MEDITRACT LLC, HEWLETT-PACKARD | 9501.45C | COMPUTER EQUIPMENT LEASE, INFORMATION TECHNOLOGY | JUNE 30, 2000/ JUNE 29, 2002 |
| LORA A. MOFFATT | MEDITRACT LLC, ASSISTANT COMMISSIONER FOR TRADEMARKS | 9501.69C | PERMITS AND LICENSES ADMINISTRATION (CORPORATE) | JUNE 7, 2000/ JUNE 7, 2005 |
| MIKE FRAZIER | MEDITRACT LLC, RANDSTAD STAFFING SERVICES | 9501.51C | PAYROLL SERVICE AGREEMENT HUMAN RESOURCES | APRIL 10, 2000/ OCTOBER 10, 2001 |
| REZA AZARM | TRACTMANAGER LLC, NOTABLE SOLUTIONS, INC. | 5896.1C | SOFTWARE LICENSE & SERVICE AGREEMENT INFORMATION TECHNOLOGY | NOVEMBER 6, 2000/ NOVEMBER 6, 2001 |
| SANDRET JOHNSON | MEDITRACT LLC, ADVENTIST HEALTH SYSTEM | 9501.7C | SOFTWARE LICENSE & SERVICE AGREEMENT, OPERATIONS | AUGUST 3, 2000/ AUGUST 2, 2003 |
| STEVE PICKETT | MEDITRACT LLC, UAB HEALTH SYSTEM | 9501.4C | SOFTWARE LICENSE & SERVICE AGREEMENT, OPERATIONS | JULY 18, 2000/ JULY 17, 2001 |
| | MEDITRACT LLC, ADP | 9501.68C | PAYROLL SERVICE AGREEMENT HUMAN RESOURCES | MARCH 10, 2000/ MARCH 10, 2001 |
| | MEDITRACT LLC, ALABAMA DIVERSIFIED HEALTH SERVICES | 9501.22C | HOSPITAL ASSOCIATION AGREEMENT MARKETING & SALES | JUNE 6, 2000/ JUNE 5, 2002 |
| | MEDITRACT LLC, BAPTIST HOSPITAL, INC. | 9501.16C | SOFTWARE LICENSE & SERVICE AGREEMENT, OPERATIONS | MAY 24, 1999/ MAY 23, 2001 |

*FIG. 7 (CONT)-1*

| OTHER SIGNATORY CONTRACTING ENTITY/VENDOR (OTHER PARTY) | CONTRACT # | CONTRACT/DEPARTMENT | ORIGINAL DATE/ EXPIRATION DATE |
|---|---|---|---|
| MEDITRACT LLC, BCBS OF TN | 9501.31C | GROUP INSURANCE POLICY, HUMAN RESOURCES | SEPTEMBER 1, 2000/ AUGUST 30, 2001 |
| MEDITRACT LLC, CHATTANOOGA DATA CONNECTION, INC. | 9501.38C | INFORMATION SERVICES AGREEMENT, INFORMATION TECHNOLOGY | JUNE 5, 2000/ JUNE 4, 2001 |
| MEDITRACT LLC, CONWAY HOSPITAL | 9501.64C | SOFTWARE LICENSE & SERVICE AGREEMENT, OPERATIONS | OCTOBER 4, 2000/ OCTOBER 16, 2003 |
| MEDITRACT LLC, CUMBERLAND MEDICAL CENTER | 9501.61C | SOFTWARE LICENSE & SERVICE AGREEMENT, MARKETING & SALES | JULY 26, 2000/ JULY 25, 2003 |
| MEDITRACT LLC, DELL FINANCIAL SERVICE L.P. | 9501.46C | COMPUTER EQUIPMENT LEASE, INFORMATION TECHNOLOGY | JANUARY 5, 2000/ JANUARY 4, 2003 |
| MEDITRACT LLC, EDGEFIELD COUNTY HOSPITAL | 9501.65C | SOFTWARE LICENSE & SERVICE AGREEMENT, OPERATIONS | OCTOBER 11, 2000/ OCTOBER 10, 2003 |
| MEDITRACT LLC, ERLANGER MEDICAL CENTER | 9501.10C | SOFTWARE LICENSE & SERVICE AGREEMENT, OPERATIONS | MAY 10, 1999/ MAY 9, 2001 |
| MEDITRACT LLC, HEALTH SHARE/THA | 9501.59C | HOSPITAL ASSOCIATION AGREEMENT, MARKETING & SALES | MAY 19, 2000/ MAY 18, 2003 |
| MEDITRACT LLC, HEART HOSPITAL IV d/b/a HEART HOSPITAL OF AUSTIN | 9501.60C | SOFTWARE LICENSE & SERVICE AGREEMENT, OPERATIONS | SEPTEMBER 1, 2000/ AUGUST 31, 2002 |
| MEDITRACT LLC, INTERLIANT INC. | 9501.27C | HOSTING SERVICES AGREEMENT INFORMATION | JUNE 1, 2000/ MAY 31, 2001 |

FIG. 7 (CONT)-2

⇦ PREVIOUS ⇧ NEXT ✢ EXPAND ⊟ COLLAPSE 🔍 SEARCH

CONTRACT SUMMARY - RESPONSIBLE PARTY

| CONTRACTING ENTITY/VENDOR (OTHER PARTY) | CONTRACT NUMBER | DEPARTMENT | ORIGINAL DATE/ EXPIRATION DATE | TOTAL |
|---|---|---|---|---|
| ▶ GARY O'GWEN | | | | 26 |
| ▼ MIKE DRAWBAUGH | | | | 1 |
| TRACTMANAGER LLC, NOTABLE SOLUTIONS, INC. | 5896.1C | SOFTWARE LICENSE & SERVICE AGREEMENT INFORMATION TECHNOLOGY | NOVEMBER 6, 2000/ NOVEMBER 6, 2001 | |
| ▶ SCOTT JEFFERY | | | | 19 |
| ▶ THOMAS RICK | | | | 2 |

⇦ PREVIOUS ⇧ NEXT ✢ EXPAND ⊟ COLLAPSE 🔍 SEARCH

TractManager
◆ CONTRACT DATABASE
Medical Demo
⊙ CONTRACT FILTER
⊙ CONTRACT
⊙ PARTY
  SIGNATORY
  OTHER SIGNATORY
  RESPONSIBLE
⊙ VENDOR (OTHER PARTY)
⊙ LOCATION
⊙ DATES
⊙ CRITICAL ISSUES
⊙ CRITICAL LIST
⊙ STATUS
⊙ NEW CONTRACT
⊙ Vendor Directory

WORK FLOW
HELP

Get Adobe Reader

*FIG. 8*

CONTRACT SUMMARY - VENDOR

| CONTRACTING ENTITY/VENDOR (OTHER PARTY) | CONTRACT NUMBER | DESCRIPTION/DEPARTMENT | ORIGINAL DATE/ EXPIRATION DATE |
|---|---|---|---|
| ▲ ADP | | | |
| ▲ ADVENTIST HEALTH SYSTEM | | | |
| ▲ ALABAMA DIVERSIFIED HEALTH SERVICES | | | |
| ▼ ASSISTANT COMMISSIONER FOR TRADE MARKS | | | |
|    MEDITRACT LLC, ASSISTANT COMMISSIONER FOR TRADEMARKS | 9501.69C | PERMITS AND LICENSES ADMINISTRATION (CORPORATE) | JUNE 7, 2000/ JUNE 7, 2005 |
| ▲ BAPTIST HOSPITAL, INC. | | | |
| ▲ BCBS OF TN | | | |
| ▲ CHATTANOOGA DATA CONNECTION, INC. | | | |
| ▲ CONWAY HOSPITAL | | | |
| ▲ CUMBERLAND MEDICAL CENTER | | | |
| ▲ DELL FINANCIAL SERVICES L.P. | | | |
| ▲ EDGEFIELD COUNTY HOSPITAL | | | |
| ▲ ERLANGER MEDICAL CENTER | | | |
| ▲ HEALTH SHARE/THA | | | |
| ▲ HEART HOSPITAL IV d/b/a HEART HOSPITAL OF AUSTIN | | | |
| ▲ HEWLETT-PACKARD | | | |
| ▲ INTERLIANT, INC. | | | |
| ▲ LEGION INSUR CO/COMP FIRST | | | |

FIG. 9 (CONT)-1

⇦ PREVIOUS ⇨ NEXT  ✢ EXPAND  ▭ COLLAPSE  🔍 SEARCH

CONTRACT SUMMARY - VENDOR

| CONTRACTING ENTITY/VENDOR (OTHER PARTY) | CONTRACT NUMBER | DESCRIPTION/DEPARTMENT | ORIGINAL DATE/ EXPIRATION DATE |
|---|---|---|---|

▲ LEICHTMAN, ROBERT
▲ LIFE CARE MANAGEMENT SERVICES
▲ LOOK OUT LEASING CO.
▲ MEDITRACT, LLC
▲ MEMORIAL HEALTH SYSTEM
▲ MHA DIVERSIFIED SERVICES, INC. MHA
▲ MSA INC.
▲ NETWORK SOLUTIONS, INC.
▲ NORTH MISSISSIPPI HEALTH SERVICES
▲ NOTABLE SOLUTIONS, INC.
▲ PERSHING, YOAKLEY & ASSOC LLC
▲ RALEIGH GENERAL HOSPITAL

⇦ PREVIOUS ⇨ NEXT  ✢ EXPAND  ▭ COLLAPSE  🔍 SEARCH

TractManager
◆ CONTRACT DATABASE
  Medical Demo
  ◆ CONTRACT FILTER
  ◆ CONTRACT
  ◆ PARTY
    SIGNATORY
    OTHER SIGNATORY
    RESPONSIBLE
  ◆ VENDOR (OTHER PARTY)
  ◆ LOCATION
  ◆ DATES
  ◆ CRITICAL ISSUES
  ◆ CRITICAL LIST
  ◆ STATUS
  ◆ NEW CONTRACT
  ◆ Vendor Directory WORK FLOW
HELP
Get Adobe Reader

*FIG. 9 (CONT)-2*

CONTRACT SUMMARY - SITE

⇦ PREVIOUS  ⇨ NEXT  ✚ EXPAND  ═ COLLAPSE  🔍 SEARCH

| CONTRACTING ENTITY/VENDOR (OTHER PARTY) | CONTRACT NUMBER | DESCRIPTION/DEPARTMENT | ORIGINAL DATE/ EXPIRATION DATE |
|---|---|---|---|
| ▼ CHATTANOOGA OFFICE | | | |
| MEDITRACT LLC, ADP | 9501.68C | PAYROLL SERVICE AGREEMENT HUMAN RESOURCES | MARCH 10, 2000/ MARCH 10, 2001 |
| MEDITRACT LLC, ADVENTIST HEALTH SYSTEM | 9501.7C | SOFTWARE LICENSE & SERVICE AGREEMENT OPERATIONS | AUGUST 3, 2000/ AUGUST 2, 2003 |
| MEDITRACT LLC, ALABAMA DIVERSIFIED HEALTH SERVICES | 9501.22C | HOSPITAL ASSOCIATION AGREEMENT MARKETING & SALES | JUNE 6, 2000/ JUNE 5, 2002 |
| MEDITRACT LLC, ASSISTANT COMMISSIONER FOR TRADEMARKS | 9501.69C | PERMITS AND LICENSES ADMINISTRATION (CORPORATE) | JUNE 7, 2000/ JUNE 7, 2005 |
| MEDITRACT LLC, BAPTIST HOSPITAL, INC. | 9501.16C | SOFTWARE LICENSE & SERVICE AGREEMENT OPERATIONS | MAY 24, 1999/ MAY 23, 2001 |
| MEDITRACT LLC, BCBS OF TN | 9501.31C | GROUP INSURANCE POLICY HUMAN RESOURCES | SEPTEMBER 1, 2000/ AUGUST 30, 2001 |
| MEDITRACT LLC, CHATTANOOGA DATA CONNECTION INC. | 9501.38C | INFORMATION SERVICES AGREEMENT INFORMATION TECHNOLOGY | JUNE 5, 2000/ JUNE 4, 2001 |
| MEDITRACT LLC, CONWAY HOSPITAL | 9501.64C | SOFTWARE LICENSE & SERVICE AGREEMENT OPERATIONS | OCTOBER 4, 2000/ OCTOBER 16, 2003 |

*FIG. 12 (CONT)-1*

CONTRACT SUMMARY - SITE

| CONTRACTING ENTITY/VENDOR (OTHER PARTY) | CONTRACT NUMBER | DESCRIPTION/DEPARTMENT | ORIGINAL DATE/ EXPIRATION DATE |
|---|---|---|---|
| ▶ CHATTANOOGA OFFICE | | | |
| MEDITRACT LLC, CUMBERLAND MEDICAL CENTER | 9501.61C | SOFTWARE LICENSE & SERVICE AGREEMENT MARKETING & SALES | JULY 26, 2000/ JULY 25, 2003 |
| MEDITRACT LLC, DELL FINANCIAL SERVICES L.P. | 9501.46C | COMPUTER EQUIPMENT LEASE INFORMATION TECHNOLOGY | JANUARY 5, 2000/ JANUARY 4, 2003 |
| MEDITRACT LLC, EDGEFIELD COUNTY HOSPITAL | 9501.65C | SOFTWARE LICENSE & SERVICE AGREEMENT OPERATIONS | OCTOBER 11, 2000/ OCTOBER 10, 2003 |
| MEDITRACT LLC, ERLANGER MEDICAL CENTER | 9501.10C | SOFTWARE LICENSE & SERVICE AGREEMENT OPERATIONS | MAY 10, 1999/ MAY 9, 2001 |
| MEDITRACT LLC, HEALTH SHARE/THA | 9501.59C | HOSPITAL ASSOCIATION AGREEMENT MARKETING & SALES | MAY 19, 2000/ MAY 18, 2003 |
| MEDITRACT LLC, HEART HOSPITAL IV d/b/a HEART HOSPITAL OF AUSTIN | 9501.60C | SOFTWARE LICENSE & SERVICE AGREEMENT OPERATIONS | SEPTEMBER 1, 2000/ AUGUST 31, 2002 |
| MEDITRACT LLC, HEWLETT-PACKARD | 9501.45C | COMPUTER EQUIPMENT LEASE INFORMATION TECHNOLOGY | JUNE 30, 2000/ JUNE 29, 2002 |

*FIG. 12 (CONT)-2*

CONTRACT SUMMARY - NOTES ORIGINAL DATE

| ORIGINAL DATE | CONTRACTING ENTITY/VENDOR (OTHER PARTY) | CONTRACT NUMBER | CONTRACT/DEPARTMENT | ORIGINAL/ EXPIRATION |
|---|---|---|---|---|
| 03/03/99 | MEDITRACT LLC, SUNTRUST BANK, CHATTANOOGA | 9501.55C | FINANCING AGREEMENT FINANCE | MARCH 3, 1999/ MARCH 3, 2005 |
| 05/10/99 | MEDITRACT LLC, ERLANGER MEDICAL CENTER | 9501.10C | SOFTWARE LICENSE & SERVICE AGREEMENT, OPERATIONS | MAY 10, 1999/ MAY 9, 2001 |
| 05/24/99 | MEDITRACT LLC, BAPTIST HOSPITAL, INC. | 9501.16C | SOFTWARE LICENSE & SERVICE AGREEMENT, OPERATIONS | MAY 24, 1999/ MAY 23, 2001 |
| 07/09/99 | MEDITRACT LLC, LIFE CARE MANAGEMENT SERVICES | 9501.13C | SOFTWARE LICENSE & SERVICE AGREEMENT, OPERATIONS | JULY 9, 1999/ JULY 8, 2001 |
| 08/12/99 | MEDITRACT LLC, UCSF STANFORD HEALTH CARE | 9501.14C | SOFTWARE LICENSE & SERVICE AGREEMENT, OPERATIONS | AUGUST 12, 1999/ AUGUST 11, 2001 |
| 08/30/99 | MEDITRACT LLC, MHA DIVERSIFIED SERVICES, INC. MHA | 9501.63C | HOSPITAL ASSOCIATION AGREEMENT MARKETING & SALES | AUGUST 30, 1999/ AUGUST 29, 2001 |
| 12/06/99 | MEDITRACT LLC, XTRA HELP PERSONNEL, INC. | 9501.72C | CONTRACT LABOR HUMAN RESOURCES | DECEMBER 6, 1999/ DECEMBER 6, 2000 |
| 12/31/99 | MEDITRACT LLC, MEDITRACT, LLC | 9501.70C | OPERATING AGREEMENT BOARD OF DIRECTORS | DECEMBER 31, 1999/ DECEMBER 31, 2000 |
| 12/31/99 | MEDITRACT LLC, ULTRAHEALTH, LLC | 9501.57C | FINANCING AGREEMENT FINANCE | DECEMBER 31, 1999/ JANUARY 1, 2002 |
| 01/05/2000 | MEDITRACT LLC, DELL FINANCIAL SERVICES L.P. | 9501.46C | COMPUTER EQUIPMENT LEASE INFORMATION TECHNOLOGY | JANUARY 5, 2000/ JANUARY 4, 2003 |

| ORIGINAL DATE | CONTRACTING ENTITY/VENDOR (OTHER PARTY) | CONTRACT NUMBER | CONTRACT/DEPARTMENT | ORIGINAL/ EXPIRATION |
|---|---|---|---|---|
| 01/13/2000 | MEDITRACT LLC, NORTH MISSISSIPPI HEALTH SERVICES | 9501.58C | SOFTWARE LICENSE & SERVICE AGREEMENT, OPERATIONS | JANUARY 13, 2000/ JANUARY 13, 2002 |
| 01/20/2000 | MEDITRACT LLC, PERSHING YOAKLEY & ASSOC LLC | 9501.24C | HOSPITAL ASSOCIATION AGREEMENT MARKETING & SALES | JANUARY 20, 2000/ JANUARY 19, 2002 |
| 02/18/2000 | MEDITRACT LLC, ST. MARY MEDICAL CENTER | 9501.20C | SOFTWARE LICENSE & SERVICE AGREEMENT, OPERATIONS | FEBRUARY 18, 2000/ FEBRUARY 17, 2003 |
| 03/10/2000 | MEDITRACT LLC, ADP | 9501.68C | PAYROLL SERVICE AGREEMENT HUMAN RESOURCES | MARCH 10, 2000/ MARCH 10, 2001 |
| 04/10/2000 | MEDITRACT LLC, RANDSTAD STAFFING SERVICES | 9501.51C | PAYROLL SERVICE AGREEMENT HUMAN RESOURCES | APRIL 10, 2000/ OCTOBER 10, 2001 |
| 04/19/2000 | MEDITRACT LLC, TALLAN HOLDINGS CO | 9501.49C | REAL ESTATE LEASE FINANCE | APRIL 19, 2000/ APRIL 18, 2003 |

EXPIRATION DATE

| EXP. DATE | CONTRACTING ENTITY/VENDOR (OTHER PARTY) | CONTRACT NUMBER | DESCRIPTION/DEPARTMENT | ORIGINAL DATE/ EXPIRATION DATE |
|---|---|---|---|---|
| 12/06/2000 | MEDITRACT LLC, XTRA HELP PERSONNEL, INC. | 9501.72C | CONTRACT LABOR HUMAN RESOURCES | DECEMBER 6, 1999/ DECEMBER 6, 2000 |
| 12/27/2000 | MEDITRACT LLC, SOUTHERN COFFEE SERVICE | 9501.71C | EQUIPMENT LEASE (OFFICE) FINANCE | JUNE 27, 2000/ DECEMBER 27, 2000 |
| 12/31/2000 | MEDITRACT LLC, MEDITRACT LLC, | 9501.70C | OPERATING AGREEMENT BOARD OF DIRECTORS | DECEMBER 31, 1999/ DECEMBER 31, 2000 |
| 03/10/2001 | MEDITRACT LLC, ADP | 9501.68C | PAYROLL SERVICE AGREEMENT HUMAN RESOURCES | MARCH 10, 2000/ MARCH 10, 2001 |
| 05/09/2001 | MEDITRACT LLC, ERLANGER MEDICAL CENTER | 9501.10C | SOFTWARE LICENSE & SERVICE AGREEMENT, OPERATIONS | MAY 10, 1999/ MAY 9, 2001 |
| 05/23/2001 | MEDITRACT LLC, BAPTIST HOSPITAL, INC. | 9501.16C | SOFTWARE LICENSE & SERVICE AGREEMENT, OPERATIONS | MAY 24, 1999/ MAY 23, 2001 |
| 05/31/2001 | MEDITRACT LLC, INTERLIANT, INC. | 9501.27C | HOSTING SERVICES AGREEMENT INFORMATION TECHNOLOGY | JUNE 1, 2000/ MAY 31, 2001 |
| 06/01/2001 | MEDITRACT LLC, INTERLIANT, INC. | 9501.35C | HOSTING SERVICES AGREEMENT INFORMATION TECHNOLOGY | JUNE 2, 2000/ JUNE 1, 2001 |
| 06/04/2001 | MEDITRACT LLC, CHATTANOOGA DATA CONNECTION, INC. | 9501.38C | INFORMATION SERVICES AGREEMENT INFORMATION TECHNOLOGY | JUNE 5, 2000/ JUNE 4, 2001 |
| 06/09/2001 | MEDITRACT LLC, LEICHTMAN, ROBERT | 9501.25C | SALE REPRESENTATIVE AGREEMENT MARKETING & SALES | JUNE 10, 2000/ JUNE 9, 2001 |

*FIG. 15 (CONT)-1*

EXPIRATION DATE

| EXP. DATE | CONTRACTING ENTITY/VENDOR (OTHER PARTY) | CONTRACT NUMBER | DESCRIPTION/DEPARTMENT | ORIGINAL DATE/ EXPIRATION DATE |
|---|---|---|---|---|
| 06/13/2001 | MEDITRACT LLC, MSA INC. | 9501.37C | EQUIPMENT LEASE (OFFICE) FINANCE | JUNE 14, 2000/ JUNE 13, 2001 |
| 07/08/2001 | MEDITRACT LLC, LIFE CARE MANAGEMENT SERVICES | 9501.13C | SOFTWARE LICENSE & SERVICE AGREEMENT, OPERATIONS | JULY 9, 1999/ JULY 8, 2001 |
| 07/17/2001 | MEDITRACT LLC, UAB HEALTH SYSTEM | 9501.4C | SOFTWARE LICENSE & SERVICE AGREEMENT, OPERATIONS | JULY 18, 2000/ JULY 17, 2001 |
| 07/19/2001 | MEDITRACT LLC, NETWORK SOLUTIONS, INC. | 9501.39C | INFORMATION SERVICES AGREEMENT INFORMATION TECHNOLOGY | JULY 20, 2000/ JULY 19, 2001 |
| 07/23/2001 | MEDITRACT LLC, LEGION INSUR CO/ COMPFIRST | 9501.34C | GROUP INSURANCE POLICY FINANCE | JULY 24, 2000/ JULY 23, 2001 |
| 08/11/2001 | MEDITRACT LLC, UCSF STANFORD HEALTH CARE | 9501.14C | SOFTWARE LICENSE & SERVICE AGREEMENT, OPERATIONS | AUGUST 12, 1999/ AUGUST 11, 2001 |

*FIG. 15 (CONT)-2*

TractManager
CONTRACT DATABASE
  Medical Demo
    CONTRACT FILTER
    CONTRACT
    PARTY
    LOCATION
    DATES
      ORIGINAL
      EXPIRATION
    MY EXPIRATION DATE
    AUTO RENEWAL
    CRITICAL ISSUES
    CRITICAL LIST
    STATUS
    NEW CONTRACT
    Vendor Directory
WORK FLOW
HELP
Get Adobe Reader

⇦ PREVIOUS  ⇨ NEXT   ✚ EXPAND   ═ COLLAPSE   🔍 SEARCH

MY EXPIRATION DATES

| EXPIRATION DATE | CONTRACTING ENTITY/VENDOR (OTHER PARTY) | CONTRACT NUMBER | DESCRIPTION/DEPARTMENT | RESPONSIBLE 1 | RESPONSIBLE 2 | STATUS |
|---|---|---|---|---|---|---|
| DECEMBER 6, 2000 | MEDITRACT LLC, XTRA HELP PERSONNEL, INC. | 9501.72C | CONTRACT LABOR HUMAN RESOURCES | SCOTT JEFFERY | TINA JOHNSON | ACTIVE |
| DECEMBER 27, 2000 | MEDITRACT LLC, SOUTHERN COFFEE SERVICE | 9501.71C | EQUIPMENT LEASE (OFFICE) FINANCE | SCOTT JEFFERY | TINA JOHNSON | ACTIVE |
| DECEMBER 31, 2000 | MEDITRACT LLC, MEDITRACT LLC, | 9501.70C | OPERATING AGREEMENT BOARD OF DIRECTORS | THOMAS RICK | SCOTT JEFFERY | ACTIVE |
| MARCH 10, 2001 | MEDITRACT LLC, ADP | 9501.68C | PAYROLL SERVICE AGREEMENT HUMAN RESOURCES | SCOTT JEFFERY | TINA JOHNSON | ACTIVE |
| MAY 9, 2001 | MEDITRACT LLC, ERLANGER MEDICAL CENTER | 9501.10C | SOFTWARE LICENSE & SERVICE AGREEMENT, OPERATIONS | GARY O'GWEN | SCOTT JEFFERY | ACTIVE |
| MAY 23, 2001 | MEDITRACT LLC, BAPTIST HOSPITAL, INC. | 9501.16C | SOFTWARE LICENSE & SERVICE AGREEMENT, OPERATIONS | GARY O'GWEN | SCOTT JEFFERY | ACTIVE |
| MAY 31, 2001 | MEDITRACT LLC, INTERLIANT, INC. | 9501.27C | HOSTING SERVICES AGREEMENT INFORMATION TECHNOLOGY | SCOTT JEFFERY | JEFF TAYLOR | ACTIVE |
| JUNE 1, 2001 | MEDITRACT LLC, INTERLIANT, INC. | 9501.35C | HOSTING SERVICES AGREEMENT INFORMATION TECHNOLOGY | SCOTT JEFFERY | JEFF TAYLOR | ACTIVE |
| JUNE 4, 2001 | MEDITRACT LLC, CHATTANOOGA DATA CONNECTION, INC. | 9501.38C | INFORMATION SERVICES AGREEMENT INFORMATION TECHNOLOGY | SCOTT JEFFERY | JEFF TAYLOR | ACTIVE |
| JUNE 9, 2001 | MEDITRACT LLC, LEICHTMAN, ROBERT | 9501.25C | SALES REPRESENTATIVE AGREEMENT MARKETING & SALES | GARY O'GWEN | SCOTT JEFFERY | ACTIVE |

*FIG. 16 (CONT)-1*

MY EXPIRATION DATES

| EXPIRATION DATE | CONTRACTING ENTITY/VENDOR (OTHER PARTY) | CONTRACT NUMBER | DESCRIPTION/DEPARTMENT | RESPONSIBLE 1 | RESPONSIBLE 2 | STATUS |
|---|---|---|---|---|---|---|
| JUNE 13, 2001 | MEDITRACT LLC, MSA INC. | 9501.37C | EQUIPMENT LEASE (OFFICE) FINANCE | SCOTT JEFFERY | TINA JOHNSON | ACTIVE |
| JULY 8, 2001 | MEDITRACT LLC, LIFE CARE MANAGEMENT SERVICES | 9501.13C | SOFTWARE LICENSE & SERVICE AGREEMENT, OPERATIONS | GARY O'GWEN | SCOTT JEFFERY | ACTIVE |
| JULY 17, 2001 | MEDITRACT LLC, UAB HEALTH SYSTEM | 9501.4C | SOFTWARE LICENSE & SERVICE AGREEMENT, OPERATIONS | GARY O'GWEN | SCOTT JEFFERY | ACTIVE |
| JULY 19, 2001 | MEDITRACT LLC, NETWORK SOLUTIONS, INC. | 9501.39C | INFORMATION SERVICES AGREEMENT INFORMATION TECHNOLOGY | SCOTT JEFFERY | JEFF TAYLOR | ACTIVE |
| JULY 23, 2001 | MEDITRACT LLC, LEGION INSUR CO/ COMPFIRST | 9501.34C | GROUP INSURANCE POLICY FINANCE | SCOTT JEFFERY | TINA JOHNSON | ACTIVE |
| AUGUST 11, 2001 | MEDITRACT LLC, UCSF STANFORD HEALTH CARE | 9501.14C | SOFTWARE LICENSE & SERVICE AGREEMENT OPERATIONS | GARY O'GWEN | SCOTT JEFFERY | ACTIVE |

*FIG. 16 (CONT)-2*

TractManager
◆ CONTRACT DATABASE
  Medical Demo
  ⓐ CONTRACT FILTER
  ⓑ CONTRACT
  ⓒ PARTY
  ⓓ LOCATION
  ⓔ DATES
     ORIGINAL
     EXPIRATION
     MY EXPIRATION DATE
     AUTO RENEWAL
  ⓕ CRITICAL ISSUES
  ⓖ CRITICAL LIST
  ⓗ STATUS
  ⓘ NEW CONTRACT
  ⓙ Vendor Directory
  ➤ WORK FLOW ➤
  HELP
  Get Adobe Reader

⇦ PREVIOUS  ⇨ NEXT  ✚ EXPAND  ⊟ COLLAPSE  🔍 SEARCH

AUTO RENEWAL

| CONTRACT NUMBER | CONTRACTING ENTITY/VENDOR (OTHER PARTY) | DESCRIPTION/DEPARTMENT | ORIGINAL DATE/ EXPIRATION DATE |
|---|---|---|---|
| 5896.1C | TRACTMANAGER LLC, NOTABLE SOLUTIONS, INC. | SOFTWARE LICENSE & SERVICE AGREEMENT INFORMATION TECHNOLOGY | NOVEMBER 6, 2000/ NOVEMBER 6, 2001 |
| 9501.10C | MEDITRACT LLC, ERLANGER MEDICAL CENTER | SOFTWARE LICENSE & SERVICE AGREEMENT, OPERATIONS | MAY 10, 1999/ MAY 9, 2001 |
| 9501.13C | MEDITRACT LLC, LIFE CARE MANAGEMENT SERVICES | SOFTWARE LICENSE & SERVICE AGREEMENT, OPERATIONS | JULY 9, 1999/ JULY 8, 2001 |
| 9501.14C | MEDITRACT LLC, UCSF STANFORD HEALTH CARE | SOFTWARE LICENSE & SERVICE AGREEMENT, OPERATIONS | AUGUST 12, 1999/ AUGUST 11, 2001 |
| 9501.16C | MEDITRACT LLC, BAPTIST HOSPITAL, INC. | SOFTWARE LICENSE & SERVICE AGREEMENT, OPERATIONS | MAY 24, 1999/ MAY 23, 2001 |
| 9501.17C | MEDITRACT LLC, SHORE HEALTH SYSTEM, INC. | SOFTWARE LICENSE & SERVICE AGREEMENT, OPERATIONS | JULY 25, 2000/ JULY 24, 2003 |
| 9501.19C | MEDITRACT LLC, VIRGINIA BLOOD SERVICES | SOFTWARE LICENSE & SERVICE AGREEMENT, OPERATIONS | JUNE 16, 2000/ JUNE 15, 2003 |
| 9501.27C | MEDITRACT LLC, INTERLIANT, INC. | HOSTING SERVICES AGREEMENT INFORMATION TECHNOLOGY | JUNE 1, 2000/ MAY 31, 2001 |
| 9501.31C | MEDITRACT LLC, BCBS OF TN | GROUP INSURANCE POLICY HUMAN RESOURCES | SEPTEMBER 1, 2000/ AUGUST 30, 2001 |
| 9501.37C | MEDITRACT LLC, MSA INC. | EQUIPMENT LEASE (OFFICE) FINANCE | JUNE 14, 2000/ JUNE 13, 2001 |

*FIG. 17 (CONT)-1*

AUTO RENEWAL

⇦ PREVIOUS ⇨ NEXT ✚ EXPAND ⊟ COLLAPSE 🔍 SEARCH

| CONTRACT NUMBER | CONTRACTING ENTITY/VENDOR (OTHER PARTY) | DESCRIPTION/DEPARTMENT | ORIGINAL DATE/ EXPIRATION DATE |
|---|---|---|---|
| 9501.4C | MEDITRACT LLC, UAB HEALTH SYSTEM | SOFTWARE LICENSE & SERVICE AGREEMENT, OPERATIONS | JULY 18, 2000/ JULY 17, 2001 |
| 9501.50C | MEDITRACT LLC, MEMORIAL HEALTH SYSTEM | SOFTWARE LICENSE & SERVICE AGREEMENT, OPERATIONS | APRIL 25, 2000/ APRIL 24, 2003 |
| 9501.58C | MEDITRACT LLC, NORTH MISSISSIPPI HEALTH SERVICES | SOFTWARE LICENSE & SERVICE AGREEMENT, OPERATIONS | JANUARY 13, 2000/ JANUARY 13, 2002 |
| 9501.59C | MEDITRACT LLC, HEALTH SHARE/THA | HOSPITAL ASSOCIATION AGREEMENT MARKETING & SALES | MAY 19, 2000/ MAY 18, 2003 |

TractManager
CONTRACT DATABASE
Medical Demo
- CONTRACT FILTER
- CONTRACT
- PARTY
- LOCATION
- DATES
  - ORIGINAL
  - EXPIRATION
  - MY EXPIRRATION DATE
  - AUTO RENEWAL
- CRITICAL ISSUES
- CRITICAL LIST
- STATUS
- NEW CONTRACT
- Vendor Directory WORK FLOW
HELP
POLICY
Get Adobe Reader

TractManager™

CONTRACT NUMBER: 9501.45C
USER CONTRACTING ENTITY: MEDITRACT LLC
VENDOR (OTHER PARTY): HEWLETT-PACKARD
CONTRACT TYPE: COMPUTER EQUIPMENT LEASE
CONTRACT EXPIRES IN: 582 DAYS

MEDITRACT LLC

PRINTER FRIENDLY VERSION

ACTIVE

EDIT

| COVER SHEET | CONTRACT & ATTACHMENT | CONTRACT NOTES | CRITICAL DATES | ASST LOG | KEY TERMS |

(OPTIONAL) ASSETS ASSOCIATED WITH THIS CONTRACT ARE LISTED BELOW

| DEPARTMENT (S) | | | | | |
|---|---|---|---|---|---|
| ASSET NAME:/ DESCRIPTION: | S/N | ASSET LOCATION (ADDRESS) | CONTACT INFO (NAME & PHONE) | ASSET RECORD COMMENTS | |
| DEPARTMENT (S) | | | | | |
| ASSET NAME:/ DESCRIPTION: | S/N | ASSET LOCATION (ADDRESS) | CONTACT INFO (NAME & PHONE) | ASSET RECORD COMMENTS | |
| DEPARTMENT (S) | | | | | |
| ASSET NAME:/ DESCRIPTION: | S/N | ASSET LOCATION (ADDRESS) | CONTACT INFO (NAME & PHONE) | ASSET RECORD COMMENTS | |
| DEPARTMENT (S) | | | | | |
| ASSET NAME:/ DESCRIPTION: | S/N | ASSET LOCATION (ADDRESS) | CONTACT INFO (NAME & PHONE) | ASSET RECORD COMMENTS | |
| DEPARTMENT (S) | | | | | |

HELP

TractManager
- CONTRACT DATABASE
  Medical Demo
- CONTRACT FILTER
- CONTRACT NUMBER
- TYPE
- PARTY
- LOCATION
- DATES
- CRITICAL ISSUES
- CRITICAL LIST
- STATUS
- NEW CONTRACT
- Vendor Directory
- ADMIN

WORK FLOW
HELP

Get Adobe Reader

TRACTMANAGER™

PRINTED ON
11/24/2000

STATUS IS
ACTIVE

CONTRACT NUMBER: 9501.45C
CONTRACTING ENTITY: MEDITRACT LLC
VENDOR (OTHER PARTY): HEWLETT-PACKARD
CONTRACT TYPE:
CONTRACT EXPIRES IN: EXPIRATION DATE UNKNOWN
582 DAYS

ORIGINAL DATE: 06/60/2000
EXPIRATION DATE: 06/29/2002
ORIGINAL TERM: 2 YEAR TERM
USER SIGNATORY: SCOTT JEFFERY, VP OPERATIONS
DESCRIPTION: LEASE FOR 19 HP 9100C DIGITAL SENDERS

SITE: CHATTANOOGA OFFICE
DEPARTMENT: INFORMATION TECHNOLOGY
GROUP:
PRODUCT:

PRIMARY: SCOTT JEFFERY, VICE PRESIDENT
SECONDARY: MIKE DRAWBAUGH, VICE PRESIDENT
OTHER SIGNATORY: JOHNNY ALVAREZ
VALUE/RATE:

CRITICAL ISSUES:

ADDENDA, EXHIBITS AND
AMENDMENTS:

| CRITICAL ISSUE | CRITICAL DATE |
|---|---|
| WARRANTY EXPIRATION | 06/60/2001 |
| EXERCISE PURCHASE OR RENEWAL OPTION | 04/30/2002 |

TITLE
APPLICATION FOR LEASE FINANCING

CONTRACT INFO (NAME & PHONE)    COMMENTS

ASSETS:

| ASSET NAME./ | S/N | DEPARTMENT/ |
| DESCRIPTION: | | ASSET LOCATION |
| | | (ADDRESS) |

KEY TERMS:

THIS IS OUR INITIAL LEASE WITH HP. THE EQUIPMENT COVERED BY THIS LEASE INCLUDES 14 HP 8100C DIGITAL SENDERS
AND 5 HP 9100C DIGITAL SENDERS. THE 14 8100s WERE ALL PLACED AT CLIENTS' LOCATIONS AND
THE 5 9100s ARE BEING USED BY OUR SCAN TEAMS.

*FIG. 33*

METHOD AND SYSTEM TO ACCESS TO ELECTRONIC BUSINESS DOCUMENTS

CROSS REFERENCE TO RELATED APPLICATIONS

This application is a continuation-in-part of U.S. patent application Ser. No. 11/142,257, filed Jun. 2, 2005, now U.S. Pat. No. 7,194,677, which is a continuation of U.S. patent application Ser. No. 09/748,105, filed on Dec. 27, 2000, now U.S. Pat. No. 6,957,384.

BACKGROUND OF INVENTION

Field of the Invention

The present invention relates to a method, system, and computer program product for storing, organizing, and providing remote access to a digital version of a paper document over the Internet. More specifically, the present invention relates to a method, system and computer program product for converting a paper documentation into a digital version of the paper document that is searchable, manageable, and remotely accessible.

Description of Prior Art

The management of paper documents has become a major concern to many companies. The organization, management, and storage of these documents can be both costly and labor intensive. In addition, the use of paper documents limits the ability of company employees to simultaneously work with the same document. As a result, work often has to be performed on a sequential basis by passing documents between employees.

Most companies do not have the resources nor the expertise necessary to convert their paper documents into an electronic format and develop a database of manageable electronic documents. Typically, companies who desire to convert their paper documents into an electronic format must use general purpose software that is not tailored to the needs of the company or is accompanied by support for developing and implementing a plan to input all the data and documents necessary to make the software function.

Accordingly, there exist a need for a method, system, and computer program product for converting paper documents into an electronic format. There is a need for the method system and computer program product to store the electronic format of the documents in a database. There is a need for the method, system, and computer program product that is easy to implement. There is a need for the method, system, and computer program product to be efficient and cost effective. There is a need for the method, system, computer program product to be flexible and have a capacity for customization to particular types of documents. There is a need for the method, system and computer program product to convert documents into an electronic format as a batch process.

SUMMARY OF THE INVENTION

According to the present invention, a method, system, and computer program product for converting a paper document into an digital version of the paper document that is searchable, manageable, remotely accessible are provided. The conversion, management, and access is made possible by a process for handling the paper document and associated data according to the present invention. The present invention is applicable to the conversion and management of a wide variety of document types. Flexibility and capacity for customization permit the present invention to be tailored to particular types of documents. One or more paper documents of a document type can be converted into a digital version as part of a batch process. Information related to, or found in, the one or more converted documents is made available to the user as well as a digital image of the one or more documents. The digital version of the one or more documents can be remotely accessed. Functions that can be performed on the one or more digital version of a document is based on access rights provided for the document.

BRIEF DESCRIPTION OF THE DRAWINGS

The above described features and advantages of the present invention will be more fully appreciated with reference to the detailed description and appended figures in which:

FIG. 1A depicts an exemplary embodiment of a coversheet according to the present invention;

FIG. 1B depicts an exemplary embodiment of a master database according to an embodiment of the present invention;

FIGS. 2-33 depict web pages of a document management system according to an exemplary embodiment of the present invention.

DETAILED DESCRIPTION OF THE INVENTION

Figure 1C:
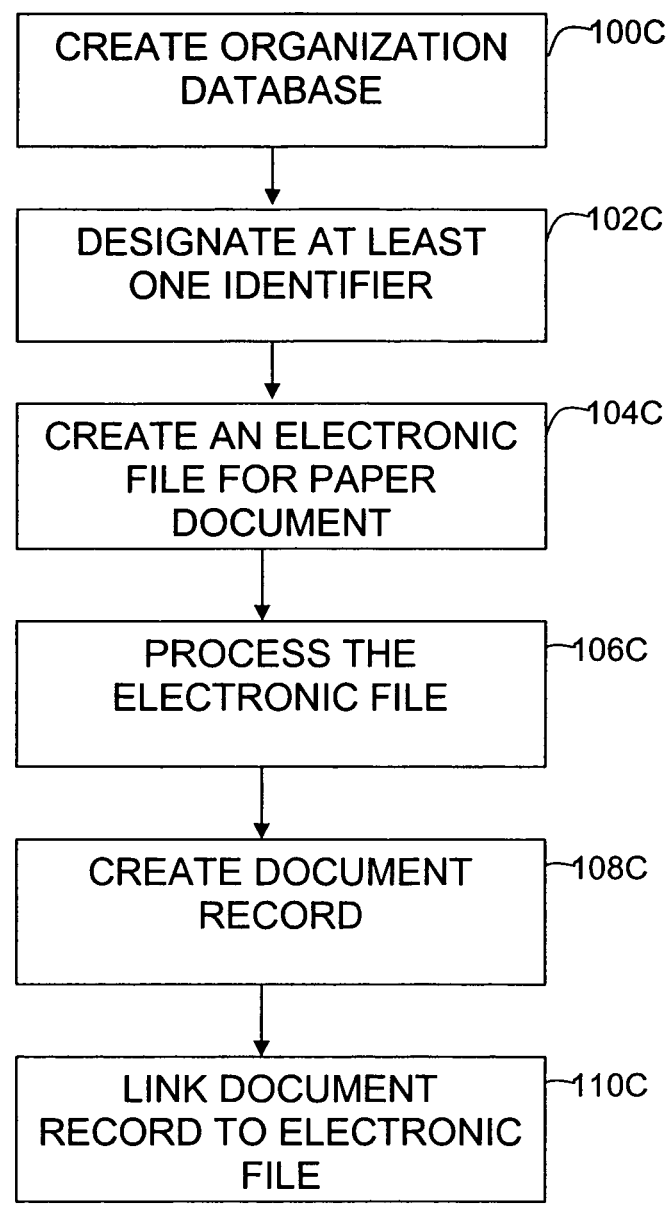
FIG. 1C depicts an exemplary flow chart of a method of converting a paper document to digital version of the according to an embodiment of the present invention.
Figure 10:
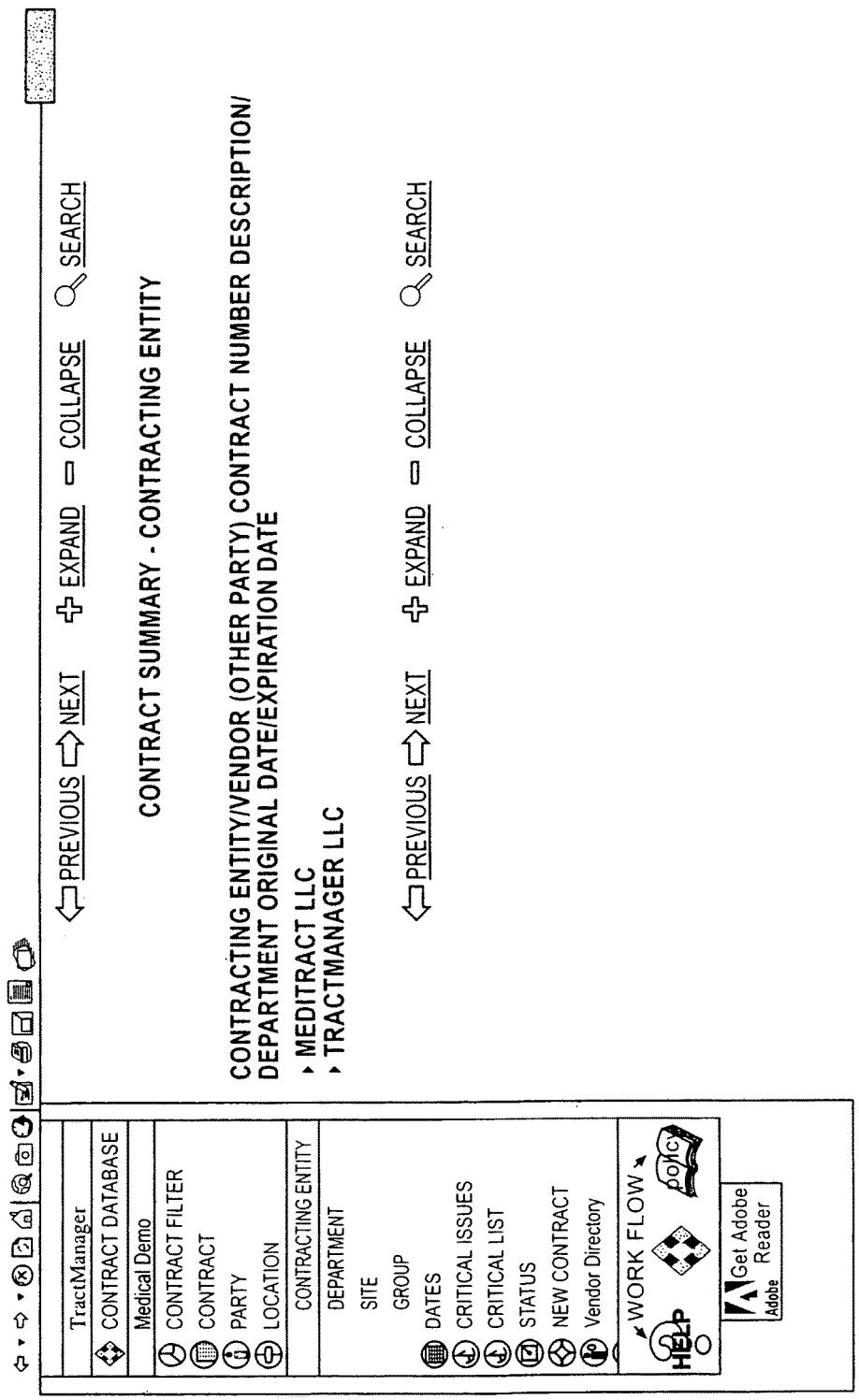
Figure 11:
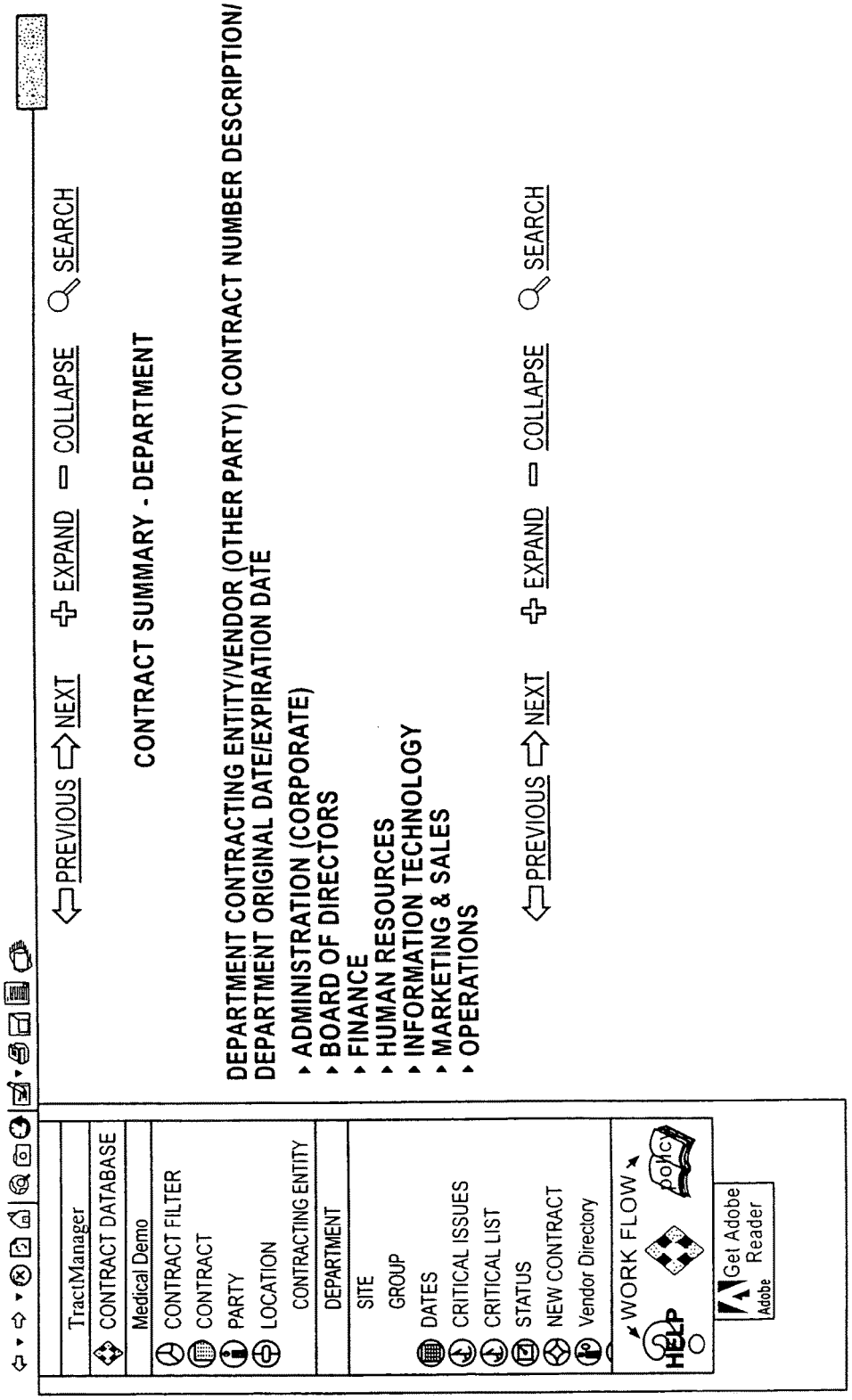
Figure 13:
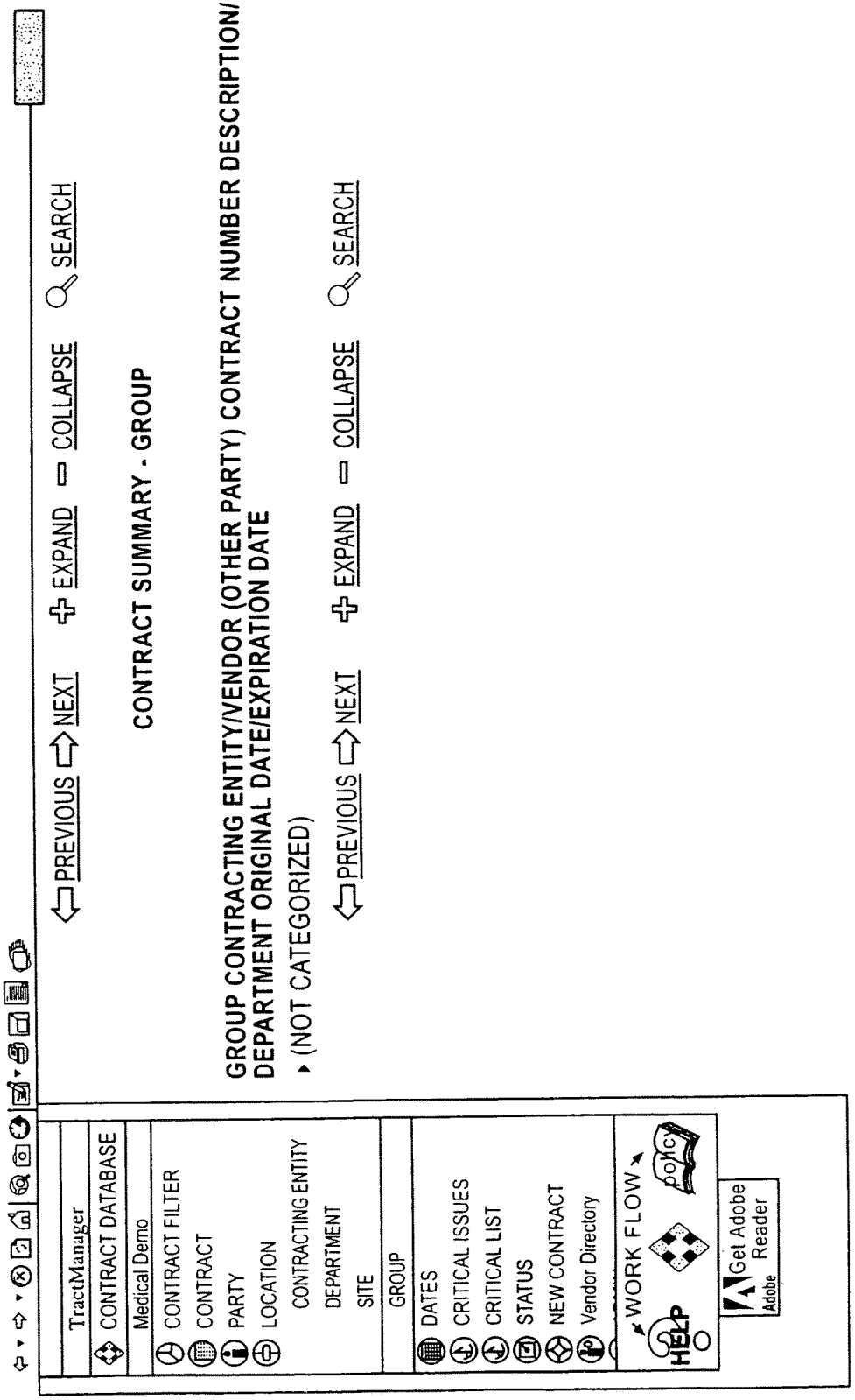

The present invention facilitates the conversion of a paper document to a digital version of the paper document and management and access of the digital version of the document to an unrivaled and heretofore unknown degree. The conversion, management, and access is made possible by a process for handling the paper documents and associated data according to the present invention. Advantageously, the present invention is applicable to the conversion and management of a wide variety of document types. The broad application of the present invention stems in part from process steps that can be sufficiently generic that they can be applied to many types of documents. The flexibility and capacity for customization permit the present invention to be tailored to particular types of documents. While particular aspects of the present invention may be discussed below in relation to contract documents, it should be kept in mind that the present invention may be applied to other documents. Of course, since just about any agreement can be considered to be a contract, even when only considering contracts, the present invention can be used on document types including, but not limited to, leases, employment contracts, purchasing agreements, permits, articles of incorporation, service agreements and partnership agreements and any other type of agreement. The present invention can find application in the law enforcement industry for processing of documents related to criminals and criminal events including, but not limited to, criminal records, miscellaneous records, photographs, and the like.

An exemplary document profile form ("coversheet") according to the present invention is shown in FIG. 1A. In the FIG. 1A embodiment of the present invention, the document profile form is used to create a searchable electronic document record of information, relate to, or found in, a paper document. The electronic document record is stored in a database of document records and associated with a digital version of the paper document. In the FIG. 1A embodiment of the present invention, the coversheet 100A includes, but is not limited to, a plurality of Database Organization Profile categories 112A-120A with a plurality of sub-category identifiers 102A-110A listed under a respective category, such as sub-category 102A identifier 102A under category 112A. Each category on a coversheet corresponds to a category of information related to, or found in, a type of document. In the FIG. 1A embodiment of the invention, the type of document is a contract, but the type of document can be any type of document that is desired to be converted into a digital version of the document such as medical records. The coversheet may be customized for the particular type of document that is to be converted into a digital version of the document. For example, if the type of document is a contract, the coversheet can include categories, such as contract type, contracting site, contracting department, contracting entity, responsible parties, authorized users and/or any other information and the sub-category identifiers provided would indicate the sub-categories available for the respective categories.

In the FIG. 1A embodiment of the present invention, each sub-category identifier represents a sub-category of the category under which the sub-category identifier is listed, maps to a sub-category of the category, and corresponds to a sub-category of information related to, or found in, a type of document. In the FIG. 1 embodiment of the present invention, each sub-category identifier is provided as an integer, but can be any symbol, character, integer, or any combination thereof. In the FIG. 1A embodiment of the present invention, a sub-category identifier is circled to designate the sub-category of information as related to, or found in, a paper document. In an embodiment of the present invention, the sub-category identifier are represented as a plurality of bubbles that a user can fill in similar to a standardized test to designate the sub-category of information for a category, as related to, or found in, a document. In an embodiment of the present invention, the coversheet is at least one piece of paper that is machine readable. In an embodiment of the present invention, the coversheet is an electronic form where a sub-category identifier can be designated using techniques, including but not limited to, manually entering a sub-category identifier, and selecting a sub-category identifiers. The designation of one or more sub-category identifiers based on information related to, or found in, a paper document characterizes the paper document, and enables the creation of an electronic document record specific to the document that provides the information, related to, or found in, the paper document.

In the FIG. 1B embodiment of the present invention, a master database 100B is shown. The master database 100B includes a plurality of categories—102B-102BN, a set of sub-categories 104B-104BN for each category, and an identifier 106B-106BN for each sub-category in each set of sub-categories. In the FIG. 1B embodiment of the present invention, the master database 100B is used as a template to generate an organization specific database that can be used to characterize a set of paper documents of an organization that are to be converted into a digital version. In the FIG. 1B embodiment of the present invention, each category 102B corresponds to a category of information that can be found in, or is related to, a type of paper document of an organization, and is stored as a separate table of the database 100B. In the FIG. 1B embodiment of the present invention, each sub-category 104B of a category corresponds to a sub-category of information for the category that can be found in, or is related to, a type of paper document of an organization, and is stored as a record of the category to which it corresponds. In the FIG. 1B embodiment of the present invention, each sub-category 104B of information is associated with an individual sub-category identifier 106B used to represent the sub-category in a category. The tables and records can be added, deleted, modified, or printed in accordance with known database management techniques.

An organization specific database can be generated using master database 100B by deleting, adding, or modifying tables and records of the master database 100B as necessary. In an embodiment of the present invention, the organization specific database can be created independently of master database 100B. In an embodiment of the present invention, records of the organization specific database may be retrieved from a spreadsheet and stored in the appropriate tables of the organization specific database. The spreadsheet can be one previously created by the organization for a particular purpose, such as tracking of documents. In an embodiment of the present invention, each record retrieved from a spreadsheet is given an identifier continuing from the last identifier in the table where the record is stored. The tables and records in an organization specific database should reflect the set of Database Organizational Profile categories, and sub-categories related to, found in, or one or more types of paper documents of the organization for which the organization specific database is being created.

Once the organization specific database is complete, it is stored for use by the organization during the conversion of a paper document to a digital version of the paper document, and used to create a coversheet specific to the organization. For example, the coversheet of FIG. 1A was created from an organization specific database of an organization, and the categories and sub-category included on the coversheet reflect the categories and sub-categories that can be found in, or are related to, one or more types of paper document of the organization. To facilitate the storage and creation of the coversheet, a list of alternatives may be developed for each piece of information included in the coversheet. Each alternative may be assigned an identifier, such as a sub-category identifier. A coversheet may be developed that includes each category and sub-category of information and the alternatives. By generating the coversheet in this manner and designating the appropriate sub-category identifiers for a paper document, the coversheet greatly facilitates the conversion of a paper document to an electronic format, where a record of information corresponding to the designated sub-category identifiers is created.

An exemplary flow chart of a method of converting a paper document to an electronic format according to an embodiment of the present invention is shown in FIG. 1C. The process begins in step 100C, where an organization specific database is created. The creation of an organization specific database includes adding, deleting or modifying one or more categories and/or sub-categories in a master database of categories and sub-categories of information that are related to, or found in, one or more types of paper documents of an organization. In an embodiment of the present invention, each of the categories and sub-categories is provided with an identifier representing the category or sub-category. In an embodiment of the present invention, each category is a table of the master database and a sub-category is a record of at least one of the category tables.

In step 102C, at least one identifier on a document profile form is designated. In an embodiment of the present invention, the designated identifier corresponds to information related to, or found in, a paper document of the organization being converted into a digital version. In an embodiment of the present invention, the document profile form is in an electronic format. In an embodiment of the present invention, the document profile form is one or more sheets of paper.

In step 104C, an electronic file of the paper document is created. The type of the electronic file includes, but is not limited to, a tiff file and pdf file. In an embodiment of the present invention, the electronic file includes an electronic image of the paper document and the pages of the document profile form for the paper document. The electronic image is created by scanning both the paper document and the one or more sheets of the document profile form for the paper document. Scanning permits a digital version of the paper document and the document profile form to be created having the actual appearance of the paper document and document profile form. In an embodiment of the present invention, the electronic file includes an electronic image of just the paper document and a document profile form file for the document profile form of the paper document is created with the electronic file. The document profile form file is created at the time the paper document is scanned, if it is determined that at least one identifier on a document profile form is designated, and includes the at least one identifier that was designated in the electronic document profile form. In an embodiment of the present invention, the electronic image is created at a remote location. In an embodiment of the present invention, the electronic file includes an electronic image of the paper document and stored as the name given to the paper document in a spreadsheet.

In step 106C, the electronic file is processed. Processing of the electronic file includes, but is not limited to, creating a document profile form file, creating a searchable text file of the electronic file, overlaying the electronic image over the searchable text file, and bookmarking the processed electronic file. In an embodiment of the present invention, the searchable text file is created using Optical Character Recognition (OCR) technology having multiple engines that create multiple searchable text files by reading the electronic file. The most accurate searchable text file is selected as the searchable text file for the documents. In an embodiment of the present invention, creating a document profile form includes reading the sheets of the document profile form in the scanned image that includes the paper document and the sheets of the document profile form, determining if at least one identifier is selected, and if so, storing the at least one identifier as the document profile form file.

In an embodiment of the present invention, at least one bookmark may be generated to facilitate searching of the information in the electronic format of the paper document. The scanned document may be automatically analyzed to generate an index of bookmark locations. Bookmark locations may be identified by a number of different criteria. The criteria can be configured to correspond to the tables and records in the organization specific database to increase the probability that the occurrence of the criteria will correspond to the location of a section where it would be desirable to have a bookmark. Bookmarking criteria includes, but is not limited to, include changes in font, changes in font size or style, the beginning of a new paragraph, and specific information within the electronic format of the paper document, such as the information represented by, or related to, the identifier designated on the document profile form. The bookmarking process may be enhanced through manual input and editing to create, delete, and edit bookmarks. The bookmarks may be reviewed to determine their accuracy in terms of placement and/or any other basis and displayed, such as within a document and alone. In an embodiment of the present invention, the bookmarks are provided as hyperlinks and takes a user to the locations in the document where the bookmark is located.

In step 108C, a document record of information related to, or found in, the paper document is created. The information in the document record includes, but is not limited to, the information represented by the identifiers designated on the document profile form for the document. In an embodiment of the present invention, the information in the document record is captured from the document profile form file. In an embodiment of the present invention, a file is created that associates name of paper document as specified in spreadsheet to the identifier given to the name in the organization specific database. The name given to the paper document as specified in the spreadsheet for the document is then associated with the identifier corresponding to the name in a file.

In step 110C, the document record is linked to the processed electronic file and stored as a digital version of the paper document. The digital version of documents may be organized, cross-referenced in a database, and permit location of related documents. For example, the vendor name listed for a contract could provide a link to all contracts for that vendor. Other information may also be linked to a document. For contracts, other information that the contracts could be cross-referenced by could include notes concerning the contracts, documents related to a contract, contact or other information for a party to the contract, critical dates, assets related to a contract, selected terms of the contract, and/or any other information. The other information linked to a contract could itself be linked to further information that the contracts may or may not be cross-referenced by. Examples of further information can include other contracts related to an asset, other contracts with a corresponding critical date, information characterizing a linked asset, and/or any other information.

The documents may be further linked to additional information regarding the documents and/or information associated with the documents may be further linked to additional information. For example, in the context of contracts, the contracts may be linked to vendor information. As described below in greater detail, if accessing a contract provides the name of the vendor or a link to the vendor, the vendor name could then provide a link to contact information for the vendor. Cross-linking the documents in a number of ways, such as through related information permits the present invention to provide unparalleled access to the documents.

With respect to contracts or any other documents that have related time and/or date, the present invention can generate alerts to designated users. The dates may be captured from the document when scanned or entered manually. Then, the system captures the date and automatically generates alerts to one or more designated users at designated intervals. In the context of contracts, the expiration date is a relevant date. Alerts of the expiration date may be sent at any interval over a period of time for every expiration date. Of course, any interval may be utilized with any associated critical date.

Acquisition of the coversheet and document information may take place anywhere. Typically, the coversheets and documents are acquired at an organizations location. The coversheets and documents may be stored on a computer storage device located at the organization site. After acquisition, the documents and coversheets may be transmitted to a central location for further processing. Alternatively, the electronic file and document profile form file can be processed remotely using electronic mail.

After acquisition of the documents and coversheets, the associated files may be stored on a server. Optical character recognition (OCR) may be carried out on the files as a batch process. Similarly, the files may be batch processed for bookmark creation. To help verify the OCR and/or bookmark creation, manual verification may be carried out after the batch processing. The scanned image of the documents may be overlaid over an OCR file representing the text of the document at this time. The OCR file typically is a read-only file to avoid alterations to the text, thereby helping to ensure that the OCR file and the image of the document correspond.

A significant aspect of the present invention is the provision of remote access to documents. The remote access typically is over the Internet. However, the present invention could provide the remote access through other means, such as a connection with a user. However, the Internet typically can provide the most easily accessible and widest available access to the documents.

With remote access comes the issue of authorization to the documents. The present invention can limit access to users to provide a variety of degrees of access to the documents. The access can be controlled by providing a list of users and the degree to which each user will have access. The access may be defined by the amount of information a user may access. The access may also be defined by the ability to edit, print and/or download information. Other examples of factors that can define a user's access to the system can include the ability to attach information to a document and/or edit information already attached to a document record. Additionally, access may be defined by the ability to create and edit a document summary page and to make global changes to summary pages related to all documents. Also, the ability to archive a document may form one factor that defines access to the system. Still further, the ability to enter and edit critical dates can define access as can the ability to enter and edit assets attached to a document. The ability to create, alter, and/or delete a vendor and/or vendor information can define access. Moreover, the ability to be named as a responsible party related to a document can be a factor in defining the degree of user access. Furthermore, access can be defined by the ability to create, edit and/or delete users. While any one or more of the above elements may be utilized to define the degree of access a user will have to a system, any other factor may also be employed.

To control access to the documents that are managed by the system of the present invention, a user typically will be required to present a password to access the system. Users may also have a user name that they may be required to present. A user will first direct a web browser to the URL for a site that provides access to the system according to the present invention. Typically, the access site will present the user with a plurality of options. For example, the access site may also be accessible by non-authorized users for the purpose of obtaining information about the system.

When authorized users arrive at the access site, the access site may include spaces for entry of the user name and password. Alternatively, the access site may provide a link to a login site, a pop-up window, or any other means that provides a login opportunity. In any of these cases, a user will type in the password and possibly user name as well.

After verifying the user's password and possibly user name correspond to an authorized user, the system will determine the degree of access associated with the user. Some embodiments of the invention will then present authorized users with a selection screen that permits the user to select various options by providing links to sites such as a library of the documents being handled for the user, a communication program, and a workflow manager that permits exchange of documents for review and comment. FIG. 2 provides an example of a selection screen. The workflow manager will be discussed in greater detail below.

Figure 3:
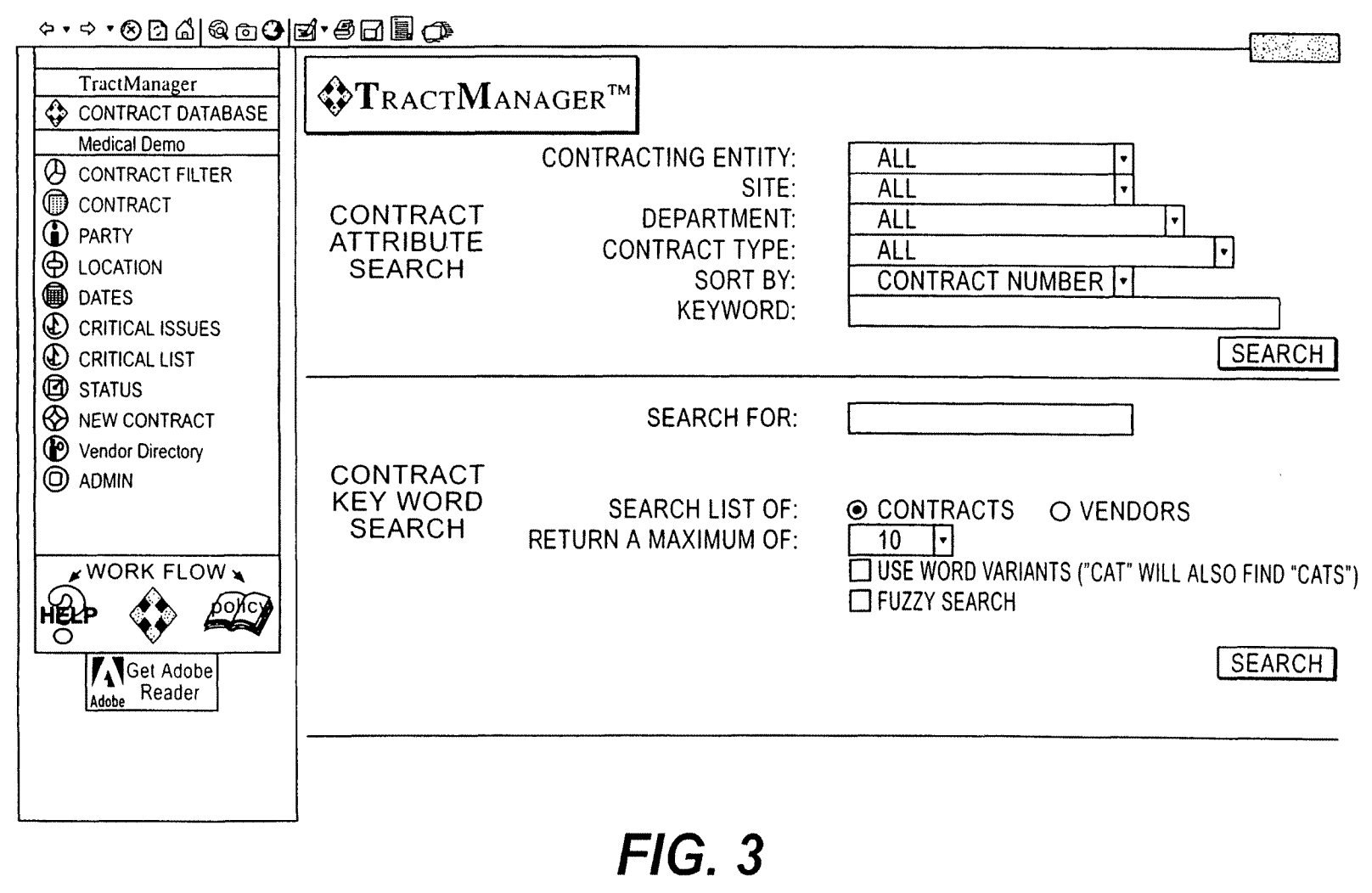

Upon selecting the library of documents, such as by clicking a mouse button when the cursor is over the appropriate active link, the system will display a document filter page. FIG. 3 provides an example of a document filter page. While the document filter page shown in FIG. 3 relates a system for managing contracts, the same page may be altered when dealing with other documents that have other associated attributes.

The document filter page can include one or more pull down menus and/or one or more boxes for entering search terms. The pull down menus may include options that form categories on the coversheet. For example, the document filter page shown in FIG. 3 includes pull down menus for contracting entity, contracting site, department, and contract type. Each of these categories could be on the coversheet. Each pull down menu, when pulled down, could display all of the options for each category. For example, if the contracts were contracts of a hospital, the "department" pull down menu could display all departments, such as cardiology, emergency room, admissions, and so on. If other documents are being handled, other pull down menus with other options may be utilized.

Selecting one of the members on a pull down menu can display all documents that correspond to the particular member selected. For example, every contract relating to a particular department may be displayed if a particular department is selected. In some cases, a user may desire to make a selection from more than one pull down menu to find particular documents. The present invention permits this to be carried out.

In addition to searching by document attributes, the present invention permits searching documents by certain keywords. The keywords could be used to search for words occurring in the text of the alternatives listed in the pull down menu options. The keyword search could be utilized in place of or in addition to the document attribute pull down menus.

In addition to searching for documents by attribute and/or attribute keyword, the present invention can also permit searching for documents by keywords that occur in the text of the documents. The lower half of the document filter web page shown in FIG. 3 includes a box for entry of text for a keyword search. As can be seen in FIG. 3, in the context of contracts, contract and vendors represent two options where a keyword search may be carried out. The number of documents revealed by a keyword search may be varied. The document filter web page shown in FIG. 3 includes a pull down menu for specifying the number of documents a keyword search will reveal. The maximum number of documents pulled up by a keyword search may be indicated in other ways, such as by clickable buttons such as those shown for designating whether contracts or vendors are to be searched in document filter web page illustrated in FIG. 3.

Searching may also be carried out using word variants. If it is desired to offer such an option, the document filter web page shown in FIG. 3 can include a box to check, as shown. The present invention may also offer the possibility for conducting a "fuzzy" search, which can expand a search to similarly sounding words or similarly spelled words or other alternatives. If it is desired to offer a fuzzy search option, the document filter web page shown in FIG. 3 can include a box to check, as shown.

Regardless of the type of search being carried out, the web page may include an active "search" button for a user to click on to initiate a search. The document filter web page represented in FIG. 3 includes such a button.

In addition to displaying search options, the search page may also display a pane that includes a menu of options for displaying documents. The menu may be expandable. The cross-linking of the documents that occurred during the storage of the documents and document information may be employed with the display menu.

FIG. 3 illustrates a display menu for a system for dealing with contracts, in particular. The menu shown in FIG. 3 includes options to display contracts based upon various characteristics. The search options in the page shown in FIG. 3 include contract, party, location, dates, critical issues, critical list, and status. The list also includes other options that do not relate to searching the contracts. These include new contract, vendor directory and administrative options. Clicking on one of the options can display all contracts with the selected attribute.

Under each of the search options shown in FIG. 3, a number of sub-options may be included. For example, the contract option may include contract number and contract type. Clicking on contract number will result in the system displaying all contracts by number. FIG. 4 illustrates a web page showing such results. Clicking on a contract number results in display of information regarding a particular contract as discussed below in greater detail. As can be seen in FIG. 4, the pane with the search options will still be displayed when viewing contracts or other documents of a particular type.

On the other hand, clicking on contract type results in the display of all of the types of contract that the particular user has entered into. FIG. 5 shows an example of contract types. Clicking on one of the contract types will expand the particular type to list all of the contracts of that type. Once all contracts of a particular type have been displayed, similar to the list in the web page shown in FIG. 4, a particular contract may be selected for viewing.

As shown in FIG. 6, the "party" search option may include a number of sub-options for searching. These can include signatory, other signatory, responsible party, and vendor or other party. Similar to contract type discussed above, clicking on one of the sub-options will result in the system displaying contracts corresponding to the sub-option. Along these lines, FIG. 6 illustrates a web page showing all contracts for particular signatories. In this case, the signatory could be clicked on to reveal all contracts that the signatory has signed or also has any other connection to. Along these lines, a signatory could be a responsible party for a contract whether or not the party has signed the contract. Clicking on a particular contract shown in FIG. 6 will lead to viewing information about the particular contract.

Listing of contracts as shown in FIG. 6 can also include information concerning the contracts. Along these lines, the web page shown in FIG. 6 has been set up to display signatory, contracting entity, vendor or other party, contract number assigned by the system, nature of the contract, contracting department, original date, and expiration date. Any other information could additionally or alternatively be displayed on this page. For example, a subset of the information shown in FIG. 6 could be displayed.

As shown in FIG. 6, any web page displayed by the present invention may include navigation aids, such as those shown at the top of the page, to go to the previous page, the next page, to expand or collapse the page, or to go back to the filter page to search. Of course, other links may be included. Similarly, the search option page may include links to help information, a workflow manager discussed below in greater detail, a policy statement, or any other element.

Another category under the party search option is "other signatory". This option can list contracts by a second signatory to a contract. The contracts may be displayed and accessed similar to the contracts shown in FIG. 6, as described above, including the additional information shown in FIG. 6. FIG. 7 represents a web page displaying contracts by "other signatory".

Additionally, the party search option may include the possibility to display contracts by responsible party. As discussed above with respect to the coversheet, one or more people may be named as responsible party for a contract. The responsible party may differ from the signatory. Similar to the display of contracts for a particular signatory or other signatory, a responsible party may be listed and all contracts for which that party is responsible also displayed. Alternatively, as shown in FIG. 8, the responsible parties may be listed without the contracts being listed. The display of contracts in FIGS. 6 and 7 could be similar to that shown in FIG. 8, in that only the party could be displayed rather than displaying all contracts. Clicking on the name of a party or an element adjacent the name of the party can result in the contracts being listed under the name of the responsible party. Additional information may be displayed for each contract as shown in FIG. 8. For example, the web page shown in FIG. 8 displays contracting entity, vendor or other party, contract number assigned by the system, nature of the contract, contracting department, original date, and expiration date. The total number of contracts for each responsible party may be displayed independent of whether all contracts are listed for a particular party. Any other information could additionally or alternatively be displayed on this page. Clicking on a contract can result in the display of information concerning that contract as described below in greater detail.

Another category included under "party" that contracts may be displayed by is vendor or other party to a contract. Clicking on "vendor" (the other party in the context of contracts) can result in the system displaying a list of vendors, as shown in the web page illustrated in FIG. 9. Each vendor may be expanded by clicking on the vendor or on a button, such as the arrows shown in FIG. 9, similar to the responsible parties shown in FIG. 8 and discussed above. Display of members of the subcategory of "vendor" could also result in all contracts for a particular vendor being displayed under each vendor. Additional information displayed for the contracts as shown in FIG. 9 may include contracting entity, vendor or other party, contract number assigned by the system, nature of the contract, contracting department, original date, and expiration date. As with the display of contracts discussed above, other information may additionally or alternatively be displayed.

FIGS. 10-13 illustrate subcategories that may be included under the location category found in the search pane. Clicking on any one of these subcategories can result in the display of all contracts related to the particular contracting entity, department, site or group, and information relevant to the contracts. Again, rather than requiring the clicking on a link, the contracts may be displayed similar to the display of contracts related to signatories as illustrated in FIG. 6.

Other relevant information with respect to contracts includes associated dates. The dates may be classified in a number of ways. For example, the original date of a contract, the expiration date of a contract, expiration dates that a particular party is responsible for, dates that certain contracts may be automatically renewed, and any other possible dates may be used to classify contracts. Other dates may be utilized to classify other documents. For example, if the present invention were utilized to organize and provide access to a set of regulations, the effective date of the regulations could be used.

FIGS. 14-17 illustrate web pages that display contracts by original date, expiration date, expiration dates for the user of the system at a particular time, and the renewal date for those with an automatic renewal provision, respectively. As shown in FIGS. 14-16, clicking on the relevant link in the search pane can result in listing contracts by the relevant date along with additional information, such as contracting entity, vendor or other party, contract number, contract type, contracting department, original date, expiration date, and/or any other information. The date can provide a hyperlink to all contracts having the relevant activity on that date. In other words, clicking on a date in the expiration date page shown in FIG. 14 can transport the user to a web page that lists all contracts expiring on that date. If the contract listed in the expiration date page were the only contract expiring on that date, then the date link could transport the user to information for that contract rather than a list since the list would only include that one contract. The web pages shown in FIGS. 14-16 also include hyperlinks to the contracts themselves through the contract number assigned by the system. FIG. 17 illustrates a web page that lists contracts with automatic renewal provisions.

Figure 18:
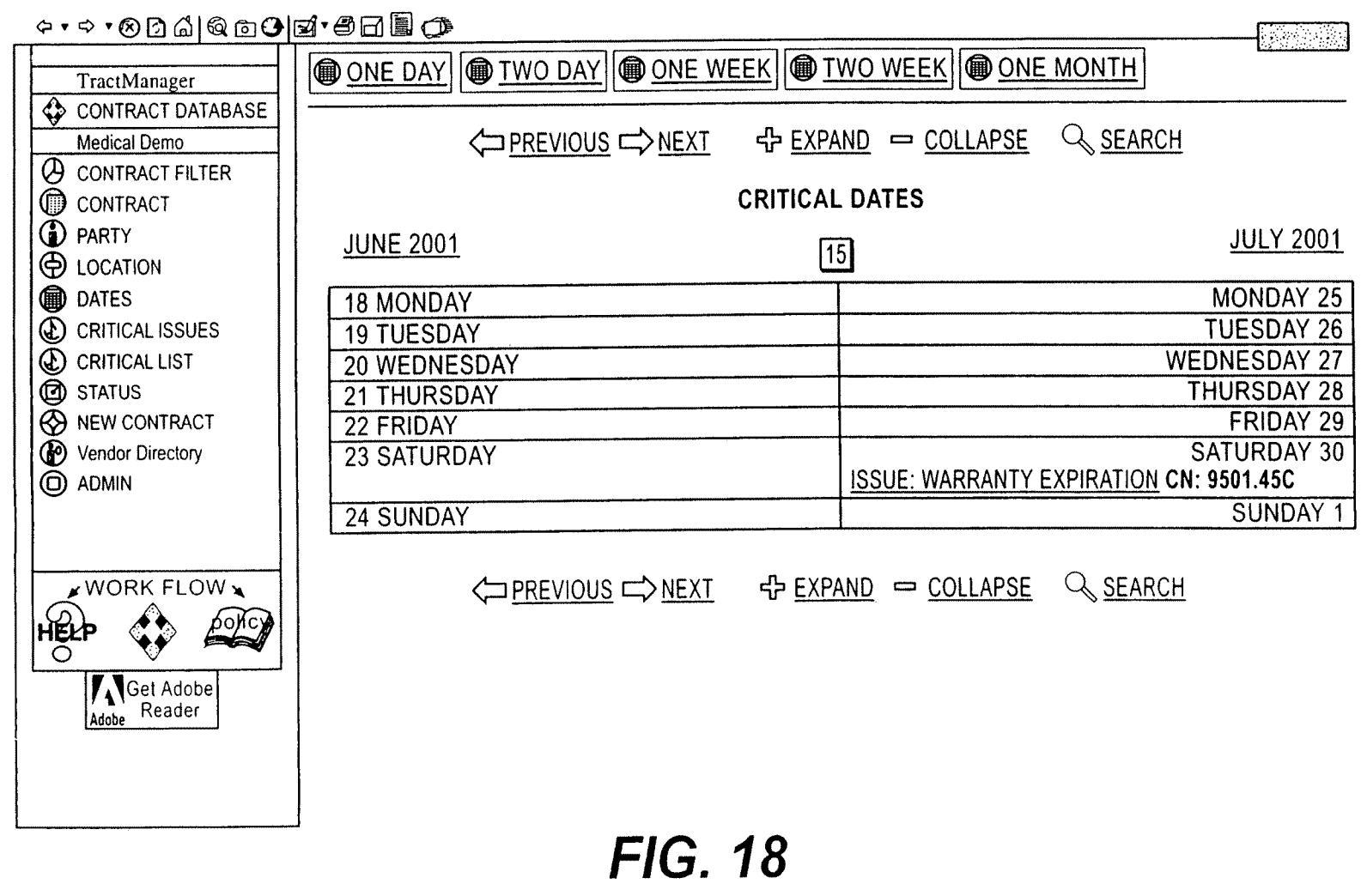

Rather than providing contracts by certain events, the present invention may sort and display contracts or other documents by critical issues and associated dates. FIG. 18 represents an example of a web page that can illustrate critical dates associated with critical issues occurring in a two-week period of time. The issue represented during the time period shown in FIG. 18 is a warranty expiration. Clicking on the issue can transport the user to the relevant portion of the contract. On the other hand, clicking on the contract number can transport the user to the contract information page described below in greater detail. Other issues, including expiration dates could also be displayed as shown in FIG. 18 rather than as represented in FIGS. 14-17.

Figure 19:
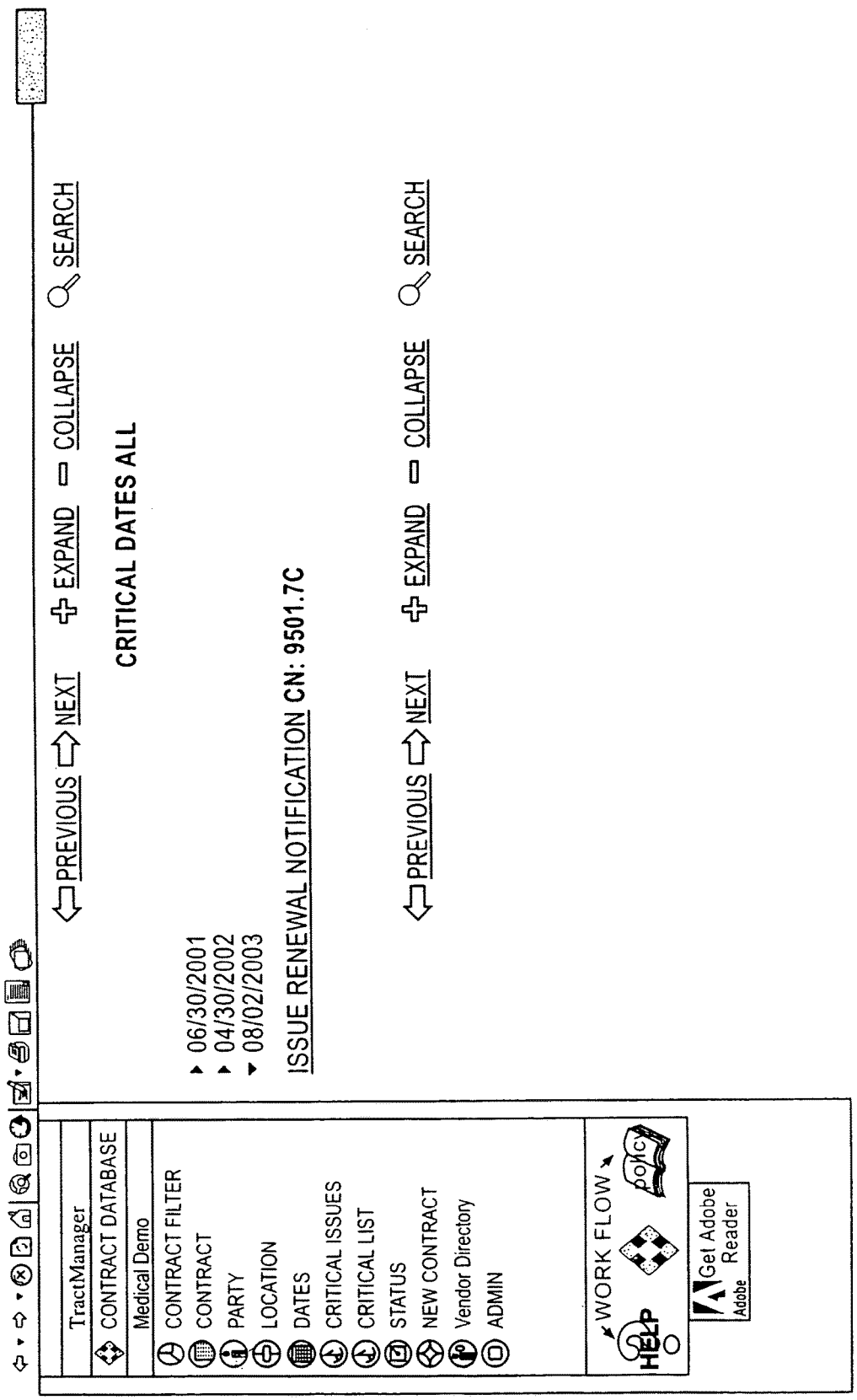

The critical issues page may also include active hyperlinks to a particular month, as shown in FIG. 18. Additionally, rather than display a two-week period, the page may display one day, one week, one month, or any other time period. Along these lines, FIG. 19 represents a web page that displays dates. By clicking on one of the dates or the button next to a date the system can display all critical issues for a particular date. As with the web page shown in FIG. 18, the issue and the contract number may provide hyperlinks to additional information.

Figure 20:
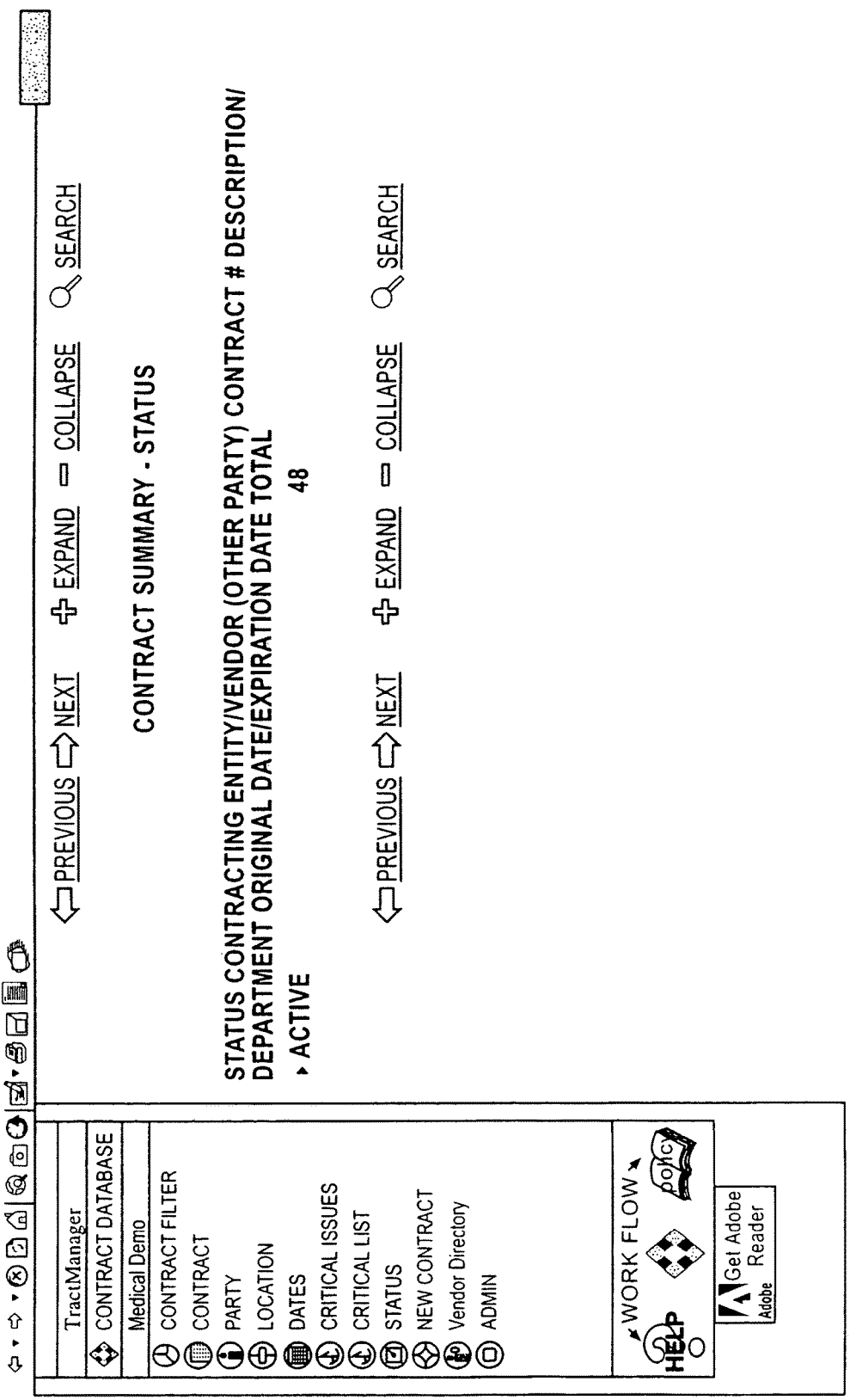

The "status" option in the search pane can result in the present invention finding contracts having certain status. Examples of status can include active, expired, and archived. Once a user clicks on the "status" option, the system will display a list of various options for contract status, such as is shown in the web page represented in FIG. 20. Clicking on a status will result in the present invention determining and displaying all contracts with the status. The present invention may also display information regarding the contracts. Examples of the information can include contracting entity, vendor or other party, contract number, contract type, contracting department, original date, expiration date, and/or any other information. Clicking on a contract number or name or an associated button could transport the user information regarding the particular contract. In any display of information associated with contracts or other documents, clicking on a listed vendor, for example, or other category could transport the user to a page listing all contracts or documents associated with the particular vendor or other category.

Figure 21:
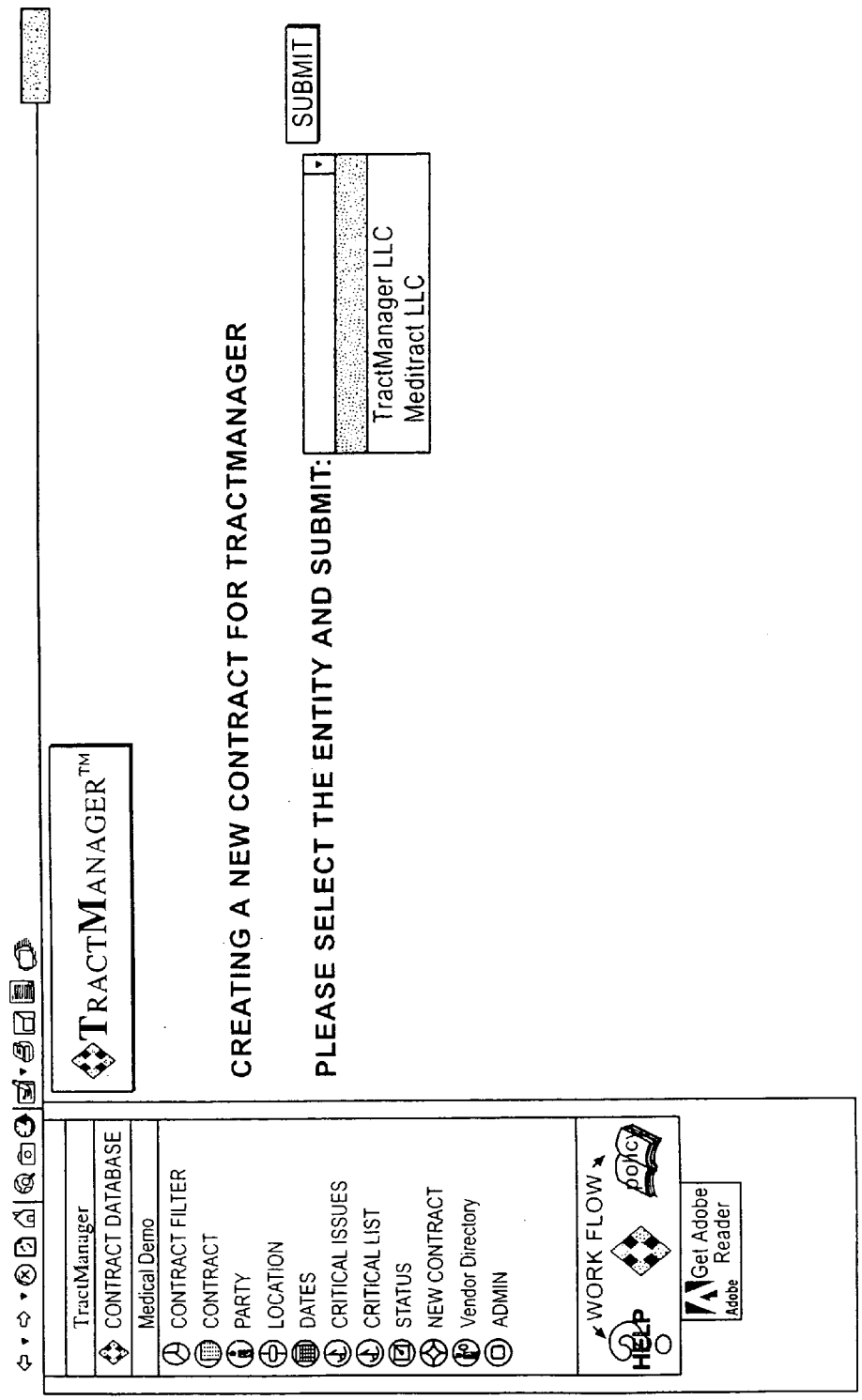

In addition to searching options, the search pane may provide links to other functions. Along these lines, the search pane may provide a link to an option for creating a new document record. The web page shown in FIG. 21 illustrates web page for creating a "new contract" record. The web page represented in FIG. 21 includes a pull down menu for selecting a contracting entity. The new document record page may include means for entering all relevant information, such as text entry boxes. Alternatively, the new document record page may include a button such as the "search" button shown in FIG. 21 that provides a link to one or more web pages that permit the user to enter information about the document record. The linked pages may also prompt the user to scan the coversheet or manually enter coversheet data. Furthermore, the linked pages may prompt the user to scan the new document.

Figure 22:
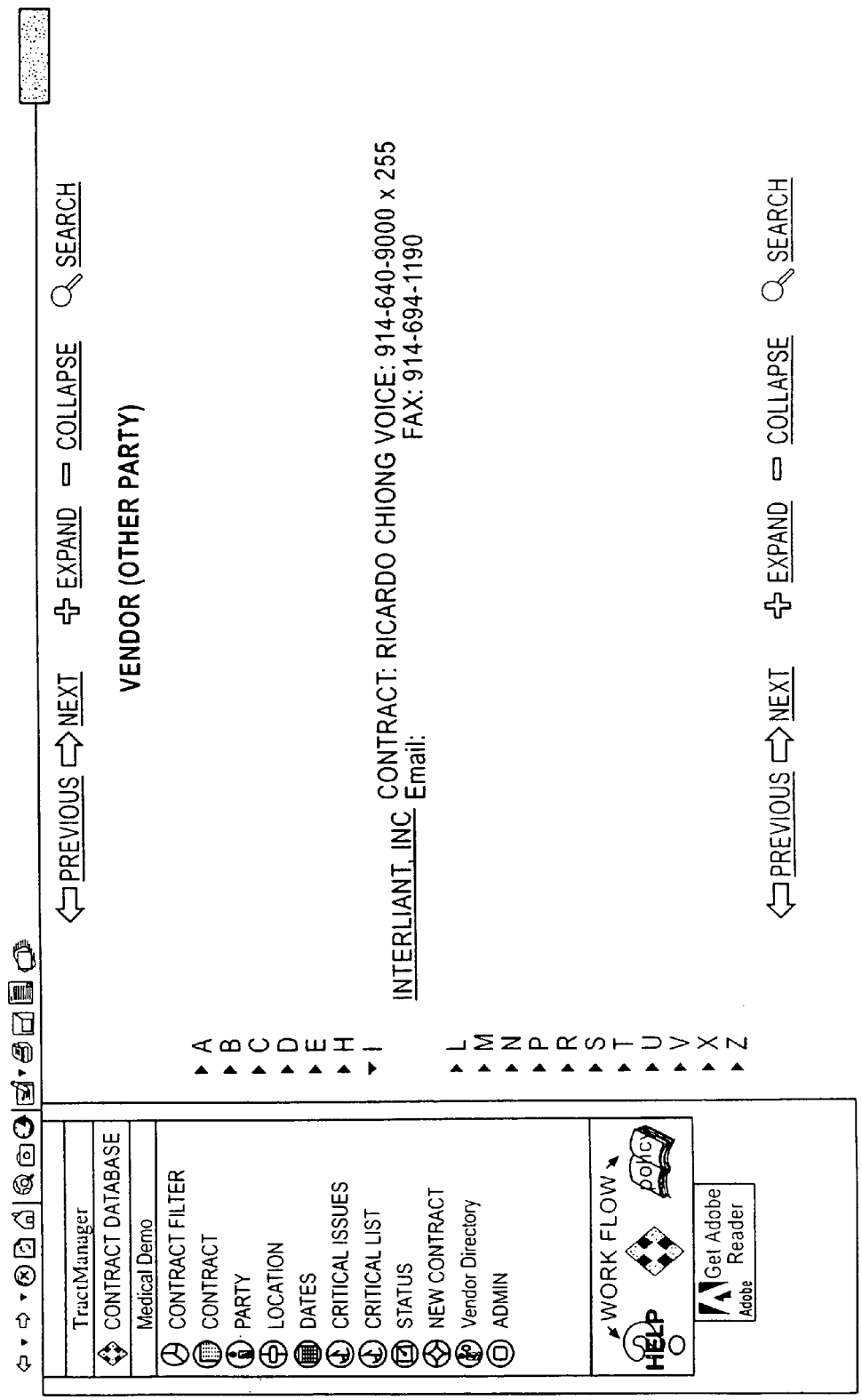
Figure 23:
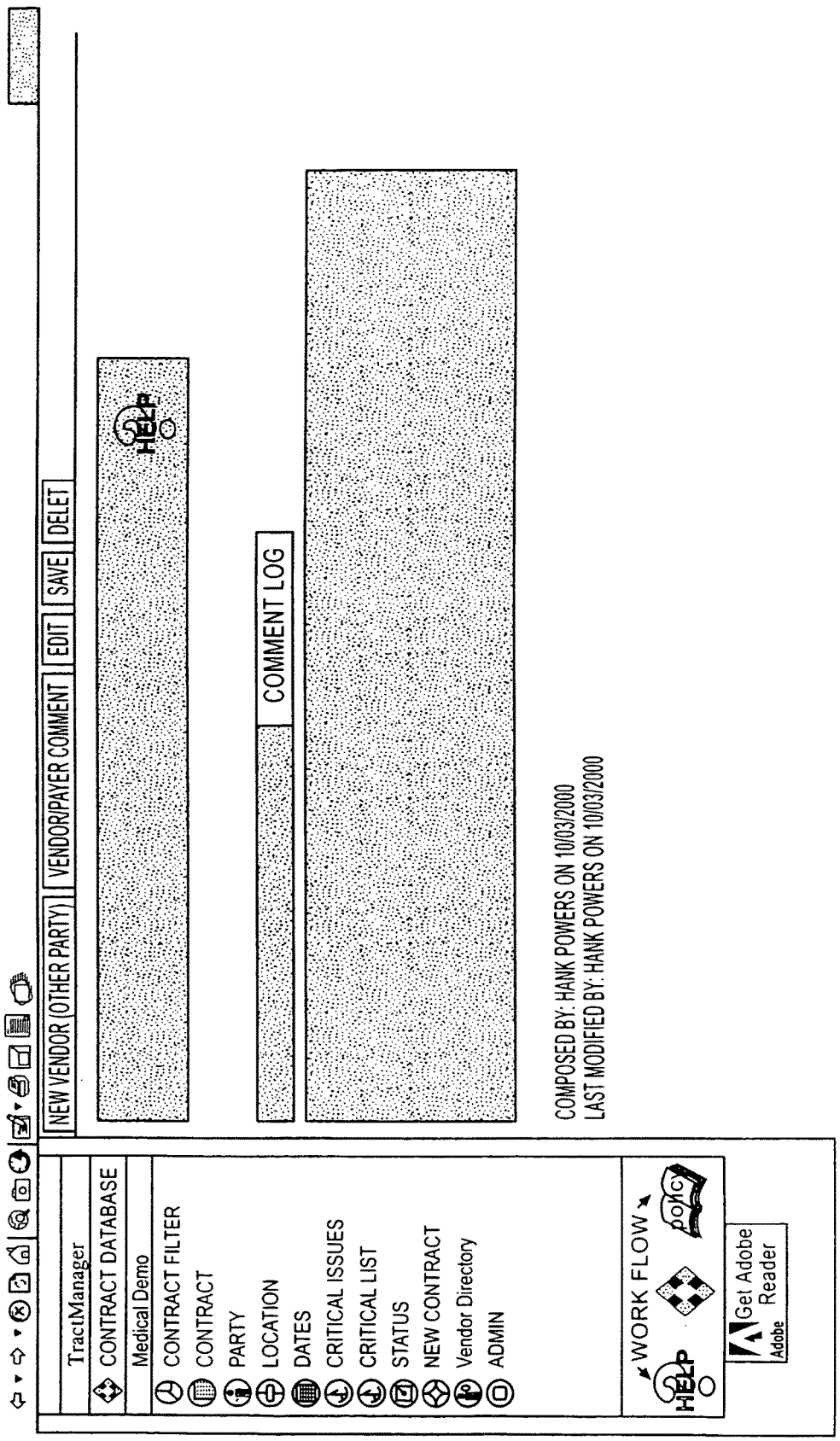

In addition to including a new document record entry option, the search pane may include links to directories of information, such as the "vendor directory" link shown in FIG. 22. The web page shown in FIG. 22 includes an alphabetical link to the vendors. Clicking on a letter or button next to the letter will cause the system to list all vendors beginning with the relevant letter. Clicking on a vendor can transport a user to a page with information about the vendor, such as is shown in FIG. 23. Of course, in the context of other documents, the directory could differ. For example, if the present invention were utilized in connection with a set of regulations, search pane could include a link to a directory of the regulating bodies.

The web page illustrating specific vendor information shown in FIG. 23 includes links to create a new vendor entry, to comments concerning a vendor and/or payer, to edit the vendor information, to save vendor information, and to delete vendor information. Other links could alternatively or additionally be included. Other vendor information could also alternatively or additionally be included.

Figure 24:
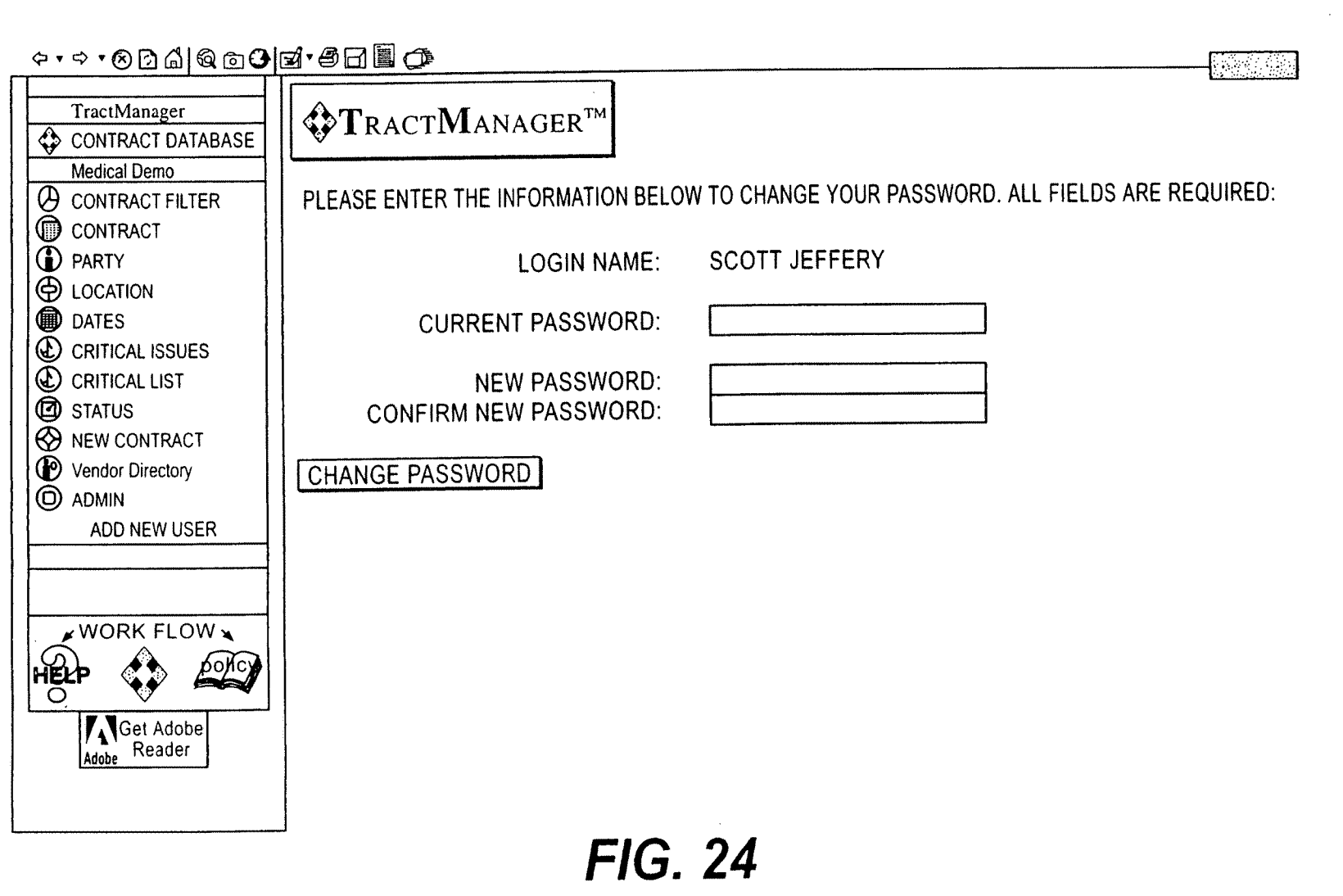

Other functions that the search pane can provide links to include administrative functions. Examples of administrative functions can include adding new users, modifying user access levels, changing passwords, as well as other functions. FIG. 24 illustrates an example of a web page for changing a user's password.

Figure 25:
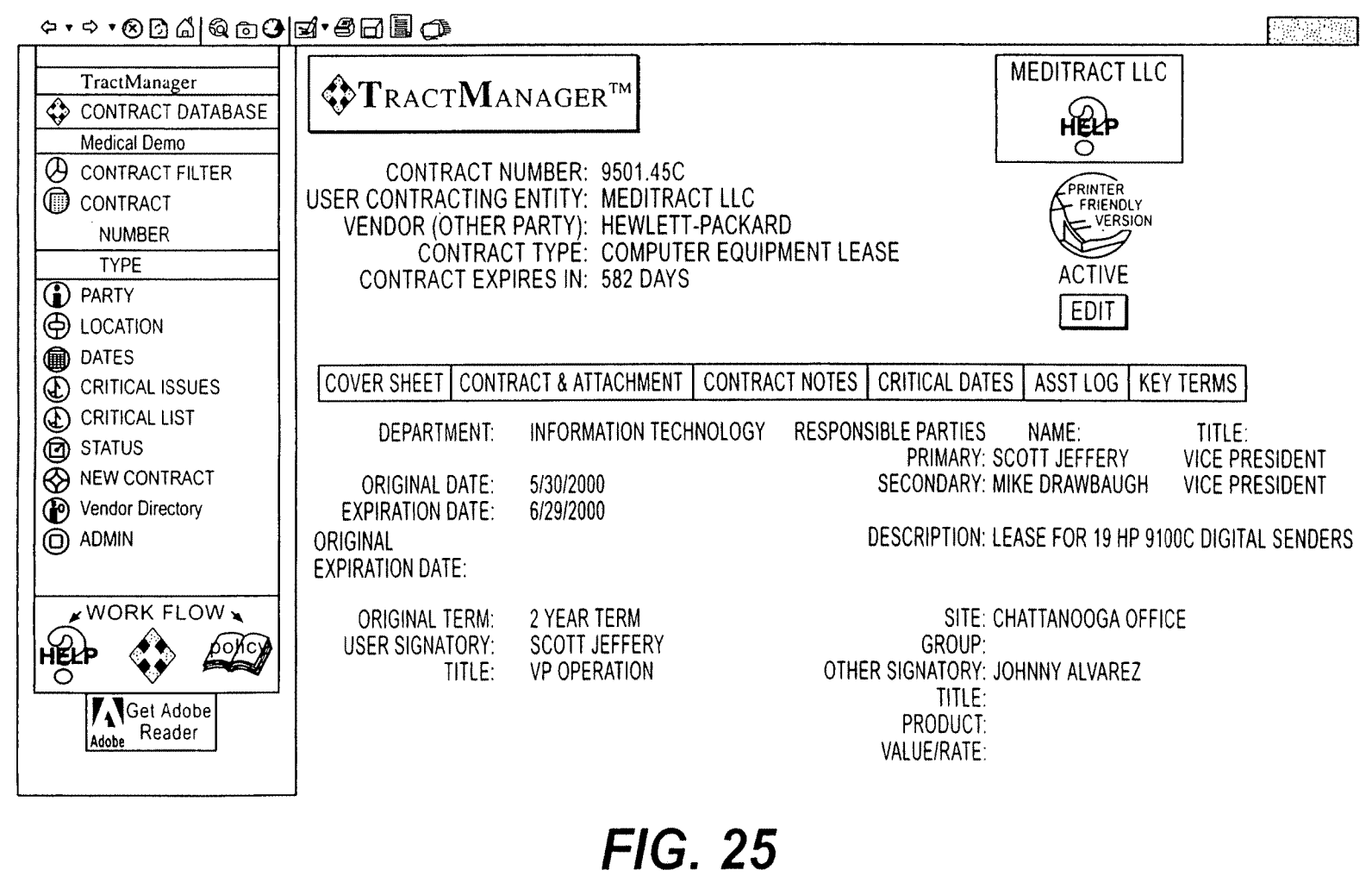

As described above, the once the search has revealed a list of documents, clicking on a document will transport a user to a document summary page. FIG. 25 illustrates an embodiment of a document summary page particular to a contract. While the web page shown in FIG. 25 may be utilized in a system for managing contracts, a similar page may be utilized for other documents. When managing other documents, the titles for various pieces of information may change.

A document summary page, such as the page shown in FIG. 25, may include a heading region 100 that includes certain pieces of information. The heading in the embodiment shown in FIG. 25 is arranged at the top of the page. However, the information in the heading could be arranged anywhere on the page, such as on the side, or at the bottom as a footer.

The heading may include any selected pieces of information. In the embodiment shown in FIG. 25, the heading includes the contract number, the contracting entity for the user, vendor or party that the contract was made with, the contract type, and the time period left on the contract. The heading region may also include links to on-line help, to a printer friendly version that includes information concerning the document as discussed below in greater detail, and to a version of the summary page that permits editing of the information. The summary region can also display the status of the document. This is particularly relevant for any time sensitive documents, such as contracts, warranties, and regulations, among others.

Entries in the heading may provide hyperlinks to additional information. Along these lines, the vendor name may provide a hyperlink to other contracts associated with the vendor. Alternatively, the vendor name could provide a link to information about the vendor, such as contact information. Similarly, the user contracting entity and contract type could provide links to other contracts having the same user contracting entity and contract type.

Typically, the document summary page includes a number of tabs 102 that control the information displayed in a document information pane. The contents of the document information pane may change, depending upon which tab is selected. However, the heading information may remain constant to provide a reference to the user.

Also, the descriptive words on each tab may change, depending upon the type of documents being managed. Along these lines, the tabs for a system particular to managing contracts may have the headings shown in FIG. 25. These headings include "coversheet", "contract & attachments", "contract notes", "critical dates", "asset log", and "key terms". The information that may be included in each of these headings will be discussed below in greater detail.

The "coversheet" tab can result in display of the information shown in FIG. 25. While this information may include some of the information in the coversheet discussed above for the coversheet described above that may be stored upon the creation of a new document record; it can include the same, less, or more information. FIG. 25 illustrates an embodiment of a coversheet tab that can include contracting department, original date, expiration date, original expiration date, original term, user signatory, title of user signatory, responsible parties names and titles, description of the contract, contracting site, contracting group, other signatory, title of the other signatory, product related to the contract, and value/rate. The information on the coversheet tab may differ for different types of documents. Also, even for contracts, the information may differ. As FIG. 25 shows, the system may not include an entry for every one of the pieces of information on the coversheet. The pieces of information and/or the entries corresponding thereto may provide hyperlinks to additional information as well as to other contracts as described above with respect to the heading region.

As with any of the tabs, clicking on the "EDIT" button in the heading region may provide a user with editing capabilities to alter any of the information in the "coversheet" information pane. Only users with authorization to edit will see the "EDIT" button. For other users the button will be hidden. Information displayed as a result of clicking on any of the tabs may be editable if desired.

Figure 26:
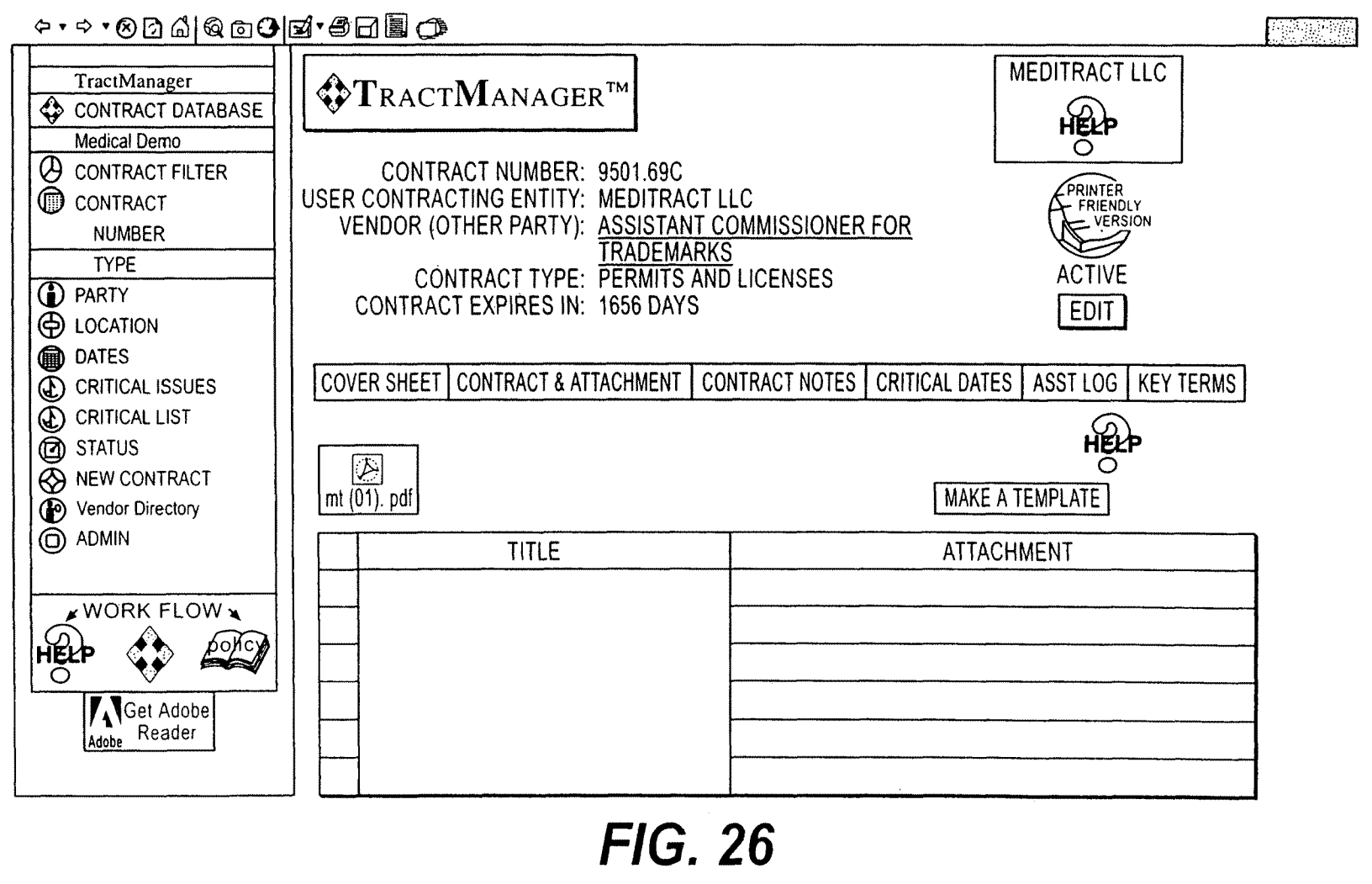

Clicking on the "contract & attachments", or more generically, "document & attachments", tab can result in display of a document information pane that includes the information shown in FIG. 26. The "contract & attachments" tab typically will include a hyperlink to the original document. Clicking on this link will launch both the image copy and the digital version of the document. The form of the document may vary, depending upon the embodiment. Typically, the original document is a "pdf" file readable by Adobe Acrobat version 3.0 or higher available from Adobe Corporation.

The "contract & attachments" tab may also result in the display of addenda, exhibits, attachments, and/or any other material to a document. Any desired material could be attached to a document. Typically, the attachment names are hyperlinks to the attachment. In the EDIT mode, attachments may be added to the tab. The attachments could be in the form of another document that is scanned in or a file on a disk, for example.

The "contract & attachments" tab may provide a button, such as the "make a template" button shown in FIG. 26 that can permit an existing document record to serve as a template for creating another document record. This can expedite and simplify the process of creating document records. If a new document record would share much information with an existing record, there is no reason to require the reentry of all information for the new document record.

Figure 27:
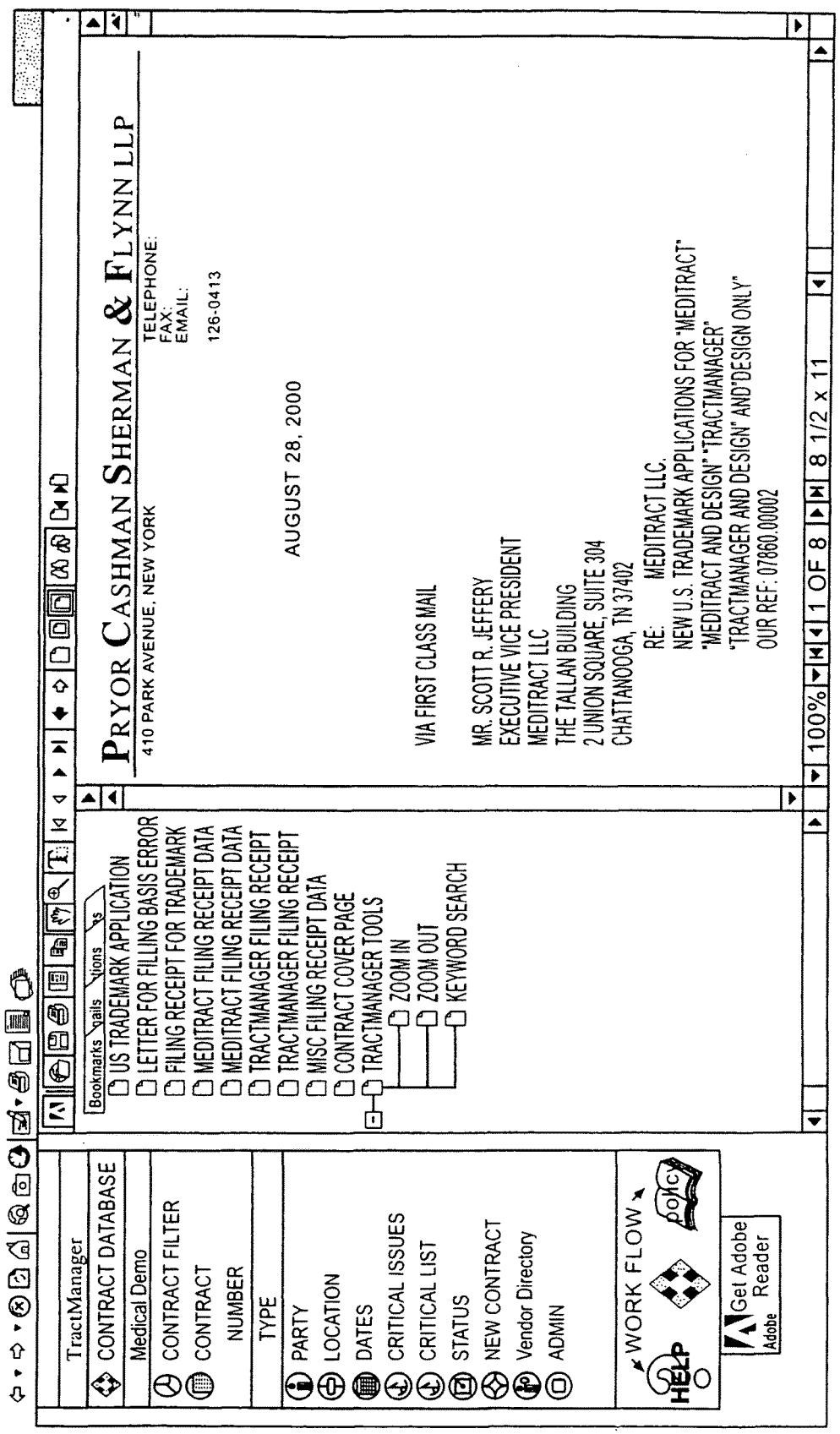
Figure 27:
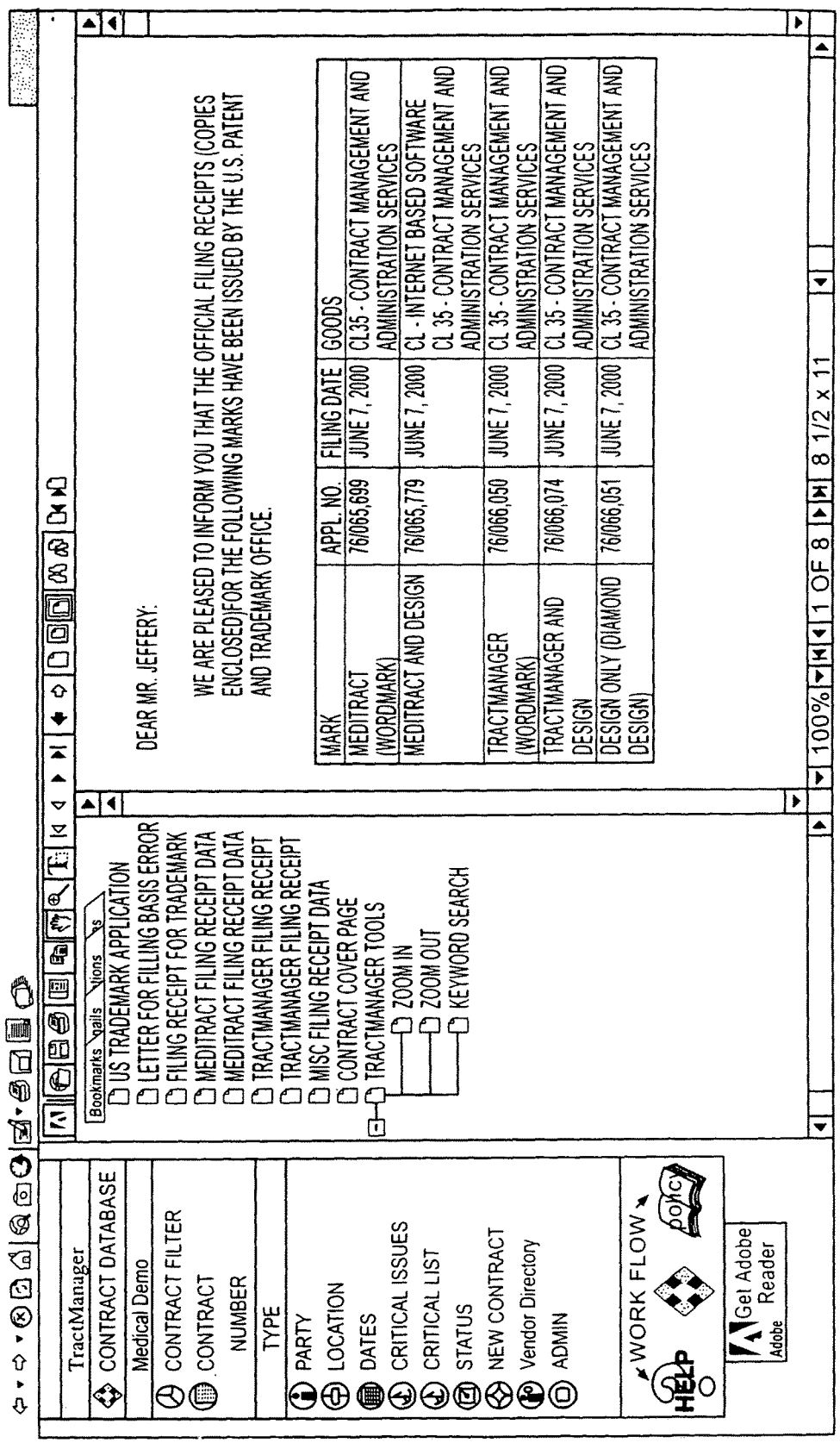

Clicking on the link to the original document will launch both the image copy of the document and the digital version of the document. FIG. 27 provides an example of a scanned image of a document, including a list of bookmarks. Clicking on a bookmark will transport the user to the corresponding region of the text. If the document is a pdf file, all of the search, navigation and manipulation tools available in Adobe Acrobat may be utilized. Since these tools are generally known, they will not be discussed in greater detail herein.

Figure 28:

FIG. 28 illustrates an embodiment of a document notes, specifically a "contract notes", information pane. This pane can include links to any notes that may have been created and attached to a document record. The notes may be listed in any order. For example, the embodiment shown in FIG. 28 lists the notes chronologically. The notes could also be listed by creator. Both the date and the creator can provide hyperlinks to a note or to a list of notes. The note could also have an associated title that could be listed and provide a hyperlink to the note. Additionally, the date, creator, or other identifying element could provide a link to a list of notes created on the same date, by the same creator or having the other element in common, respectively. The "document notes" information pane may also provide a link to create a new note.

Figure 29:

Critical issues, such as dates, associated with a document may be listed in a "critical dates" information pane by clicking on the "critical dates" tab. FIG. 29 illustrates an embodiment of such a pane. As FIG. 29 illustrates, the critical dates pane may list the issue, the associated date, the page of a document relevant to the date, and a link to the relevant language on the relevant page. Alternatively, the link could be to a window that displays relevant language from a document. The issues may be listed alphabetically, chronologically, in order of appearance in a document, or otherwise. The text describing the issue could provide a hyperlink to the relevant portion of the document or to a window as described above. The text could also provide a link to all contacts having a similar issue. Similarly, the date could provide a link to the relevant portion of the document, a window with relevant portions of the document, or to a list of all contracts with critical issues on that date.

Another tab on the document page could provide information concerning assets related to a document. FIG. 30 illustrates an embodiment of a related "asset log" information pane. Assets may be listed alphabetically by name, numerically by serial number, by address, by contact, or otherwise. In the embodiment shown in FIG. 30, the listing of assets may include asset name and description, asset serial number, asset location, contact information for a party somehow related to the asset, and comments. Each of these headings and/or the information for an asset listed in the heading can provide a link to additional information concerning the asset, to contracts related to the asset, to other assets at the location, to other assets having a common contact, to additional information about an asset or contact, to a relevant portion of the document, or any other information. As with the document note, the asset log could include a clickable button for creating a new asset record to be attached to a document.

Another tab that may be included on a document information page can include a "key terms" tab. The key terms tab can provide a pane that can display selected portions of a document. This can avoid the necessity to retrieve that entire document since the terms may be cut and paste into the key terms pane. The key terms pane may include a link to the document and to the location of the particular text. The edit function can permit a user to add terms to the document record.

The printer friendly version can provide access to a single page containing the information stored on the "summary sheet", "contract and attachments", "critical dates", "asset log", and "key terms" information panes for easy viewing and printing. The information that is included on the printer friendly page can vary, depending upon the system. FIG. 33 represents an embodiment of a printer friendly version of information related to a document that is a contract.

Figure 32:
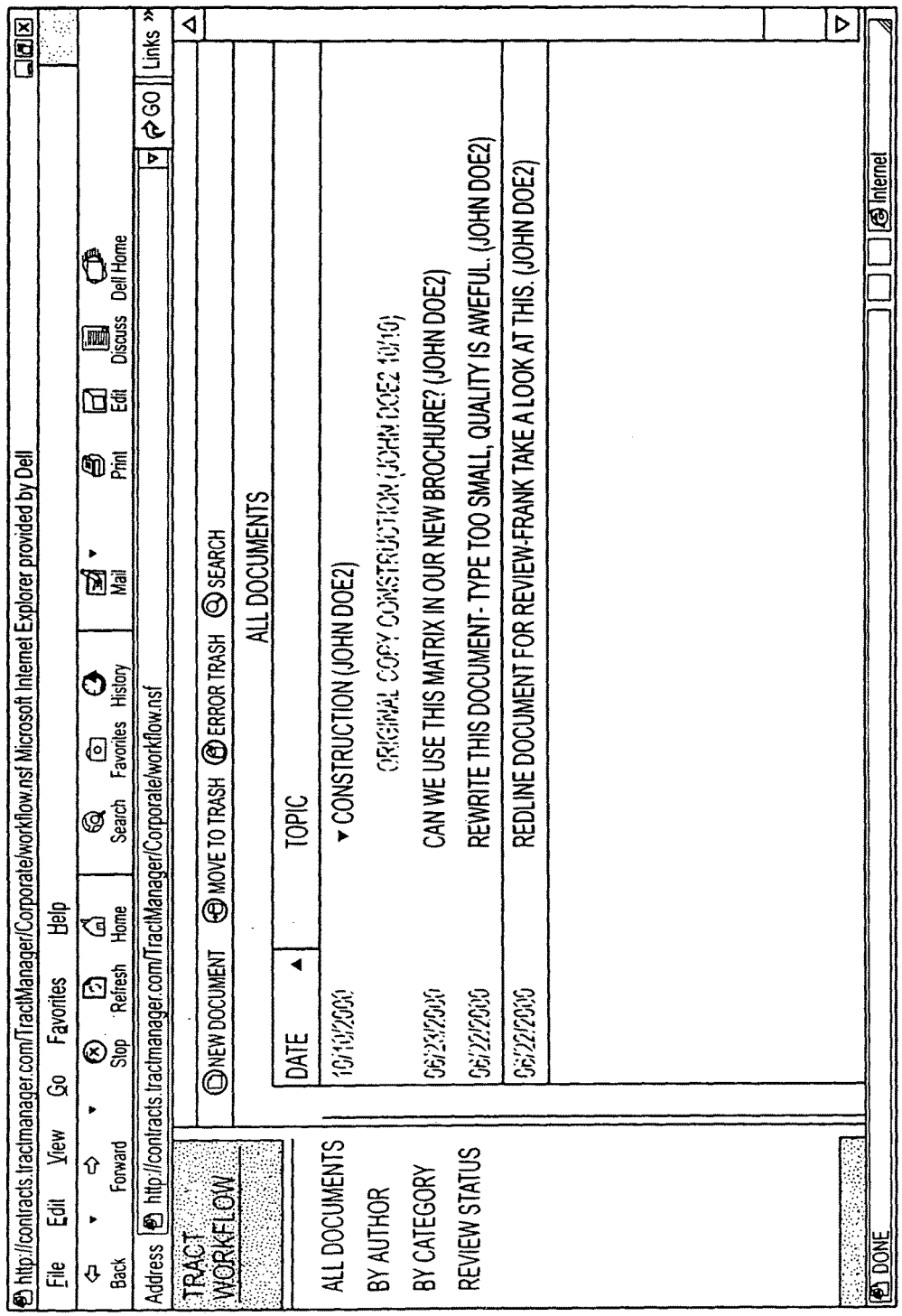
Figure 34:
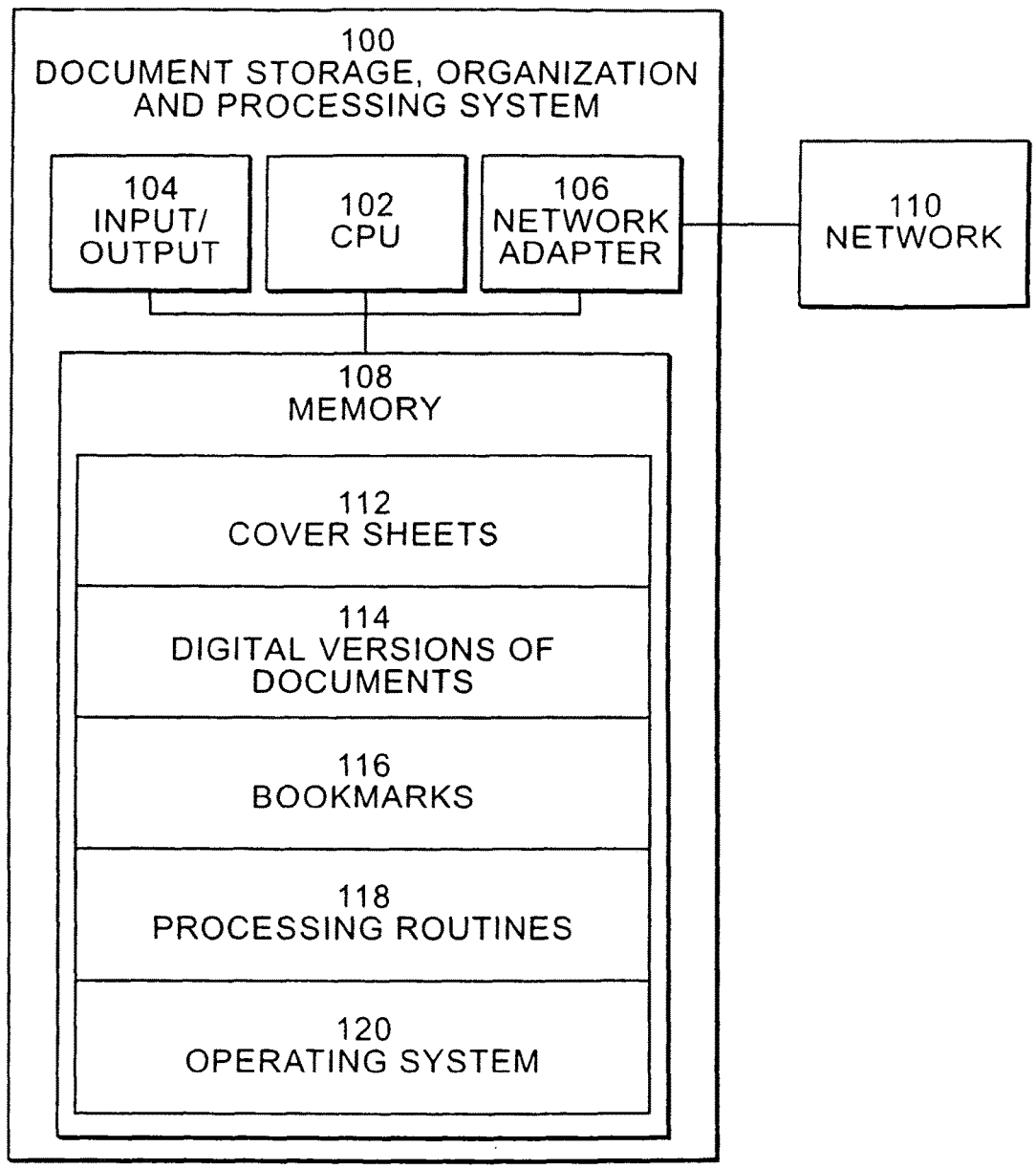
FIG. 34 represents an exemplary block diagram of a computer system according to the present invention.

As referred to above, a system according to the present invention may include a workflow manager. The workflow manager can permit users to exchange documents in the process of being drafted. The users can include comments on the documents and then forward the comments to other users. FIG. 32 illustrates an embodiment of a workflow manager web page. The workflow manager page shown in FIG. 32 includes a date that action was taken and a listing of topic. The workflow manager can also include links to all documents being handled through the workflow manager, documents by author, documents by category, alternate name, and review status of documents. Clicking on one of the links transports a user to a list of all documents or all documents organized as indicated by the link. The topic and/or date shown in FIG. 32 may also provide links to pages of documents or actions by date, to the particular document referred to by the topic, or to a page that includes information regarding the status of the review, including current, prior and future reviewers, originator of the review, category of the document, and/or any other information. A page concerning a particular review may also include a link to permit attachment of other documents or information of any kind.

Another significant advantage of the present invention relates to the ability to track documents by any relevant characteristic, making it possible to determine the percentage of documents for a particular entity.

An exemplary block diagram of a document storing, organizing and access system 100, according to the present invention, is shown in FIG. 33. A document storing, organizing and access system 100 is typically a programmed general-purpose computer system, such as a personal computer, workstation, server system, and minicomputer or mainframe computer. A document storing, organizing and access system 100 includes processor (CPU) 102, input/output circuitry 104, network adapter 106, and memory 108. CPU 102 executes program instructions in order to carry out the functions of the present invention. Typically, CPU 102 is a microprocessor, such as an INTEL PENTIUM® processor, but may also be a minicomputer or mainframe computer processor. Input/output circuitry 104 provides the capability to input data to, or output data from, computer system 100. For example, input/output circuitry may include input devices, such as keyboards, mice, touchpads, trackballs, scanners, etc., output devices, such as video adapters, monitors, printers, etc., and input/output devices, such as, modems, etc. Network adapter 106 interfaces transaction processing system 100 with network 110. Network 110 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 108 includes a plurality of blocks of data, such as coversheet block 112, document digital version block 114, and bookmarks block 116, and a plurality of blocks of program instructions, such as processing routines 118 and operating system 120. Document digital version block 114 stores a plurality of scanned documents and searchable text files that have been received by the document storing, organizing and access system 100. Coversheet block 112 stores a plurality of coversheets that may be relevant to one or more documents received by the document storing, organizing and access system. Bookmarks block 118 stores a plurality of bookmarks that may be used to identify portions of the digital versions of the documents. Processing routines 118 are software routines that implement the processing performed by the present invention. Operating system 120 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Among the advantages of the present invention in the context of contract are that it permits managing and monitoring of contract performance. Also, the present invention can help to reduce the cost of doing business and improve control of business. Additionally, through the present invention, contracts or other documents may be tracked and accessed anywhere that Internet access exists. In the context of contracts, the present invention can permit standardization of vendor contracts. Through the creation of a contract or other document database, the present invention can assist in auditing the status of contracts, record activity to a particular contract or contracts, and permit unparalleled access to information. Furthermore, through the control of information that the present invention provides, economies of scale may be realized through consolidation of vendors and efficiencies of internal audits may be improved by ready access to information that did not exist in the past. Still further, the present invention can prevent payment on expired contracts, realize the value of warranties and service agreements and reduce the cost of internal audits.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What we claim is:

1. A method in a computing system for controlling access to document records and document summary pages associated with digital versions of paper contracts associated with a corporate entity, the method comprising:
   maintaining, by a computing system, an organization-specific database having corporate entities and authorized users;
   receiving, by the computing system, scanned images of paper contracts;
   processing, by the computing system, each scanned image of a paper contract to generate a searchable text file corresponding to text contained in the scanned image;
   using the organization-specific database, generating, by the computing system, a graphical interface allowing for the selection of a corporate entity and an authorized user from a plurality of presented corporate entities and authorized users;
   receiving, by the computing system, an indication of at least one corporate entity and at least one authorized user associated with each paper contract;
   generating, by the computing system, a document record for each paper contract, the document record associating the scanned image of a paper contract with the searchable text file associated with the scanned image of the paper contract, the indication of the at least one corporate entity and at least one authorized user associated with the paper contract;
   generating, by the computing system, a document summary page for each paper contract having fields populated with summarized terms of the paper contract;
   setting, by the computing system, an access level associated with each paper contract; and
   limiting, by the computing system, the access of the at least one authorized user to information associated with a document record and to a document summary page based on the access level of the corresponding paper contract.

2. The method of claim 1, wherein the indication of at least one corporate entity and at least one authorized user are received via a document profile form.

3. The method of claim 1, wherein the organization-specific database further has departments and the graphical interface allows for the selection of a department, further comprising:
   receiving an indication of at least one department associated with each paper contract, wherein the document record further associates the at least one department with the corresponding scanned image of the paper contract.

4. The method of claim 1, wherein the organization-specific database further has contract types and the graphical interface allows for the selection of a contract type, further comprising:
   receiving an indication of at least one contract type associated with each paper contract, wherein the document record further associates the at least one contract type with the corresponding scanned image of the paper contract.

5. The method of claim 1, wherein the organization-specific database further has site types and the graphical interface allows for the selection of a site type, further comprising:
   receiving an indication of at least one site type associated with each paper contract, wherein the document record further associates the at least one site type with the corresponding scanned image of the paper contract.

6. The method of claim 1, wherein limiting the access of the at least one authorized user comprises limiting an authorized user's ability to edit information associated with a document record.

7. The method of claim 1, wherein limiting the access of the at least one authorized user comprises limiting an authorized user's ability to print information associated with a document record.

8. The method of claim 1, wherein limiting the access of the at least one authorized user comprises limiting an authorized user's ability to download information associated with a document record.

9. The method of claim 1, wherein limiting the access of the at least one authorized user comprises limiting an authorized user's ability to delete information associated with a document record.

10. The method of claim 1, wherein the access level associated with each paper contract is set for each of a plurality of authorized users.

11. The method of claim 10, further comprising:
    verifying a name and a password for an authorized user; and
    permitting the authorized user to access information associated with a document record in accordance with the access level set for that authorized user.

12. The method of claim 1, further comprising enabling an authorized user to search for paper contracts associated with a particular corporate entity.

13. The method of claim 1, further comprising generating a graphical interface that allows an authorized user to select a corporate entity in order to access scanned images of paper contracts associated with the selected corporate entity.

14. A system for controlling access to information pertaining to a digital version of a paper contract associated with a corporate entity, the system comprising:

a processor operable to execute computer program instructions; and a memory operable to store computer program instructions executable by the processor, for performing the steps of:

maintaining an organization-specific database having corporate entities and authorized users;

receiving scanned images of paper contracts;

processing each scanned image of a paper contract to generate a searchable text file corresponding to text contained in the scanned image;

using the organization-specific database, generating a graphical interface allowing for the selection of a corporate entity and an authorized user from a plurality of presented corporate entities and authorized users;

receiving an indication of at least one corporate entity and at least one authorized user associated with each paper contract;

generating a document record for each paper contract, the document record associating the scanned image of a paper contract with the searchable text file associated with the scanned image of the paper contract and the indication of the at least one corporate entity and at least one authorized user associated with the paper contract;

generating a document summary page for each paper contract having fields populated with summarized terms of the paper contract;

setting an access level associated with each paper contract;

limiting the access of the at least one authorized user to information associated with a document record and to a document summary page based on the access level of the corresponding paper contract.

15. The system of claim 14, wherein the indication of at least one corporate entity and at least one authorized user are received via a document profile form.

16. The system of claim 14, wherein the organization-specific database further has departments and the graphical interface allows for the selection of a department, further comprising:

receiving an indication of at least one department associated with each paper contract, wherein the document record further associates the at least one department with the corresponding scanned image of the paper contract.

17. The system of claim 14, wherein the organization-specific database further has contract types and the graphical interface allows for the selection of a contract type, further comprising:

receiving an indication of at least one contract type associated with each paper contract, wherein the document record further associates the at least one contract type with the corresponding scanned image of the paper contract.

18. The system of claim 14, wherein the organization-specific database further has site types and the graphical interface allows for the selection of a site type, further comprising:

receiving an indication of at least one site type associated with each paper contract, wherein the document record further associates the at least one site type with the corresponding scanned image of the paper contract.

19. The system of claim 14, wherein limiting the access of the at least one authorized user comprises limiting an authorized user's ability to edit information associated with a document record.

20. The system of claim 14, wherein limiting the access of the at least one authorized user comprises limiting an authorized user's ability to print information associated with a document record.

21. The system of claim 14, wherein limiting the access of the at least one authorized user comprises limiting an authorized user's ability to download information associated with a document record.

22. The system of claim 14, wherein limiting the access of the at least one authorized user comprises limiting an authorized user's ability to delete information associated with a document record.

23. The system of claim 14, wherein the access level associated with each paper contract is set for each of a plurality of authorized users.

24. The system of claim 23, further comprising:

verifying a name and a password for an authorized user; and permitting the authorized user to access information associated with a document record in accordance with the access level set for that authorized user.

25. The system of claim 14, further comprising enabling an authorized user to search for paper contracts associated with a particular corporate entity.

26. The system of claim 14, further comprising generating a graphical interface that allows an authorized user to select a corporate entity in order to access scanned images of paper contracts associated with the selected corporate entity.

27. A non-transitory computer-readable storage medium containing instructions for execution on a computer to control access to a document record and a document summary associated with a digital version of a paper contract associated with a corporate entity, by:

maintaining an organization-specific database having corporate entities and authorized users;

receiving scanned images of paper contracts;

processing each scanned image of a paper contract to generate a searchable text file corresponding to text contained in the scanned image;

using the organization-specific database, generating a graphical interface allowing for the selection of a corporate entity and an authorized user from a plurality of presented corporate entities and authorized users;

receiving an indication of at least one corporate entity and at least one authorized user associated with each paper contract;

generating a document record for each paper contract, the document record associating the scanned image of a paper contract with the searchable text file associated with the scanned image of the paper contract and the indication of the at least one corporate entity and at least one authorized user associated with the paper contract;

generating a document summary page for each paper contract having fields populated with summarized terms of the paper contract;

setting an access level associated with each paper contract; and limiting the access of the at least one authorized user to information associated with a document record and to a document summary page based on the access level of the corresponding paper contract.

28. The non-transitory computer-readable storage medium of claim 27, wherein the indication of at least one corporate entity and at least one authorized user are received via a document profile form.

29. The non-transitory computer-readable storage medium of claim 27, wherein the organization-specific database further has departments and the graphical interface allows for the selection of a department, further comprising:
   receiving an indication of at least one department associated with each paper contract, wherein the document record further associates the at least one department with the corresponding scanned image of the paper contract.

30. The non-transitory computer-readable storage medium of claim 27, wherein the organization-specific database further has contract types and the graphical interface allows for the selection of a contract type, further comprising:
   receiving an indication of at least one contract type associated with each paper contract, wherein the document record further associates the at least one contract type with the corresponding scanned image of the paper contract.

31. The non-transitory computer-readable storage medium of claim 27, wherein the organization-specific database further has site types and the graphical interface allows for the selection of a site type, further comprising:
   receiving an indication of at least one site type associated with each paper contract, wherein the document record further associates the at least one site type with the corresponding scanned image of the paper contract.

32. The non-transitory computer-readable storage medium of claim 27, wherein limiting the access of the at least one authorized user comprises limiting an authorized user's ability to edit information associated with a document record.

33. The non-transitory computer-readable storage medium of claim 27, wherein limiting the access of the at least one authorized user comprises limiting an authorized user's ability to print information associated with a document record.

34. The non-transitory computer-readable storage medium of claim 27, wherein limiting the access of the at least one authorized user comprises limiting an authorized user's ability to download information associated with a document record.

35. The non-transitory computer-readable storage medium of claim 27, wherein limiting the access of the at least one authorized user comprises limiting an authorized user's ability to delete information associated with a document record.

36. The non-transitory computer-readable storage medium of claim 27, wherein the access level associated with each paper contract is set for each of a plurality of authorized users.

37. The non-transitory computer-readable storage medium of claim 36, further comprising:
   verifying a name and a password for an authorized user; and
   permitting the authorized user to access information associated with a document record in accordance with the access level set for that authorized user.

38. The non-transitory computer-readable storage medium of claim 27, further comprising enabling an authorized user to search for paper contracts associated with a particular corporate entity.

39. The non-transitory computer-readable storage medium of claim 27, further comprising generating a graphical interface that allows an authorized user to select a corporate entity in order to access scanned images of paper contracts associated with the selected corporate entity.

* * * * *

UNITED STATES PATENT AND TRADEMARK OFFICE
CERTIFICATE OF CORRECTION

PATENT NO. : 10,114,821 B2
APPLICATION NO. : 11/201178
DATED : October 30, 2018
INVENTOR(S) : Rizk et al.

It is certified that error appears in the above-identified patent and that said Letters Patent is hereby corrected as shown below:

On the Title Page

Item (54), in Column 1, in "Title", Line 1, after "TO" insert -- MANAGE --.

In the Specification

In Column 1, Line 1, after "TO" insert -- MANAGE --.

In Column 16, Line 24, delete "electromechanical" and insert -- electro-mechanical --, therefor.

Signed and Sealed this
Eighteenth Day of June, 2019

Andrei Iancu
*Director of the United States Patent and Trademark Office*